US012804586B2

(12) United States Patent
Cheung et al.

(10) Patent No.: US 12,804,586 B2
(45) Date of Patent: Nov. 17, 2026

(54) TIME-RELATED NETWORK RESOURCE MANAGEMENT

(71) Applicant: Nokia Technologies Oy, Espoo (FI)

(72) Inventors: Benjamin Cheung, Murray Hill, NJ (US); Konstantinos Samdanis, Munich (DE)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 18/560,464

(22) PCT Filed: Jul. 5, 2021

(86) PCT No.: PCT/EP2021/068501

§ 371 (c)(1),
(2) Date: Nov. 13, 2023

(87) PCT Pub. No.: WO2023/280378

PCT Pub. Date: Jan. 12, 2023

(65) Prior Publication Data

US 2024/0251376 A1 Jul. 25, 2024

(51) Int. Cl.
*H04W 72/0446* (2023.01)
*H04W 36/32* (2009.01)
*H04W 64/00* (2009.01)

(52) U.S. Cl.
CPC ......... *H04W 64/00* (2013.01); *H04W 36/324* (2023.05); *H04W 72/0446* (2013.01)

(58) Field of Classification Search
CPC ........................... H04W 64/00; H04W 36/324; H04W 72/0446
See application file for complete search history.

(56) References Cited

U.S. PATENT DOCUMENTS

2013/0170695 A1* 7/2013 Anan .................. H04N 19/467
382/100
2015/0078262 A1 3/2015 Irigi et al.
2021/0021494 A1 1/2021 Yao et al.

OTHER PUBLICATIONS

"3rd Generation Partnership Project; Technical Specification Group Services and System Aspects; Management and orchestration; 5G performance measurements (Release 17)", 3GPP TS 28.552, V17. 2.1, Apr. 2021, pp. 1-240.

(Continued)

*Primary Examiner* — Allahyar Kasraian
*Assistant Examiner* — Gilbert M. Grant
(74) *Attorney, Agent, or Firm* — Barta Jones, PLLC

(57) ABSTRACT

A method, comprising the steps of collecting, from an access network element, a plurality of time-related geospatial location information associated to a respective one out of a plurality of mobile devices, wherein the plurality of time-related geospatial location information indicates the respective mobile devices' geospatial locations at certain times; developing, based on the plurality of time-related geospatial location information, a time series cumulative distribution function, wherein the time series cumulative distribution function indicates a probability that a geospatial location defined by its coordinate values of a respective one out of the plurality of mobile devices has coordinate values less than or equal to a selected geospatial location's coordinate values; generating configuration information for the access network element, indicative of a time-related allocation of network resources to the plurality of mobile devices based on the time series cumulative distribution function; and providing the configuration information to the access network element.

3 Claims, 14 Drawing Sheets

(56) References Cited

OTHER PUBLICATIONS

"3rd Generation Partnership Project; Technical Specification Group Services and System Aspects; Management and orchestration; Management Data Analytics (MDA) (Release 17)", 3GPP TS 28.104, V0.0.0, Apr. 2021, pp. 1-7.
"3rd Generation Partnership Project; Technical Specification Group Services and System Aspects; Management and orchestration; 5G end to end Key Performance Indicators (KPI) (Release 17)", 3GPP TS 28.554, V17.2.0, Mar. 2021, pp. 1-38.
"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.4.0, Mar. 2021, pp. 1-35.
"3rd Generation Partnership Project; Technical Specification Group Core Network and Terminals; 5G System; Location Management Services; Stage 3 (Release 17)", 3GPP TS 29.572, V17.0.0, Mar. 2021, pp. 1-83.
"3rd Generation Partnership Project; Technical Specification Group Services and System Aspects; Management and orchestration; Concepts, use cases and requirements (Release 17)", 3GPP TS 28.530, V17.1.0, Mar. 2021, 32 pages.
"Generic Network Slice Template", GSM Association, NG. 116, Version 5.0, Jun. 1, 2021, pp. 1-68.
Wang et al., "Spatial-Temporal Distribution of Mobile Traffic and Base Station Clustering Based on Urban Function in Cellular Networks", Wireless Internet, May 13, 2018, pp. 300-312.
"3rd Generation Partnership Project; Technical Specification Group Services and System Aspects; Management and orchestration; 5G Network Resource Model (NRM); Stage 2 and stage 3 (Release 17 )", 3GPP TS 28.541, V17.2.1, Apr. 2021, pp. 1-425.
"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.
"NRM modelling of SliceProfile", 3GPP TSG-SA5 Meeting #132e, S5-204279, Agenda: 6.5.5, Huawei, Aug. 17 28, 2020, 4 pages.
"NRM modelling of SliceProfile for RAN domain", 3GPP TSG-SA5 Meeting #133e, S5-205205, Huawei, Oct. 12-21, 2020, 17 pages.
International Search Report and Written Opinion received for corresponding Patent Cooperation Treaty Application No. PCT/EP2021/068501, dated Mar. 29, 2022, 12 pages.
Ferrus et al., "Data Analytics Architectural Framework for Smarter Radio Resource Management in 5G Radio Access Networks", IEEE Communications Magazine, vol. 58, No. 5, May 2020, pp. 98-104.
"3rd Generation Partnership Project; Technical Specification Group Services and System Aspects; Management and orchestration; Study on enhancement of Management Data Analytics (MDA) (Release 17)", 3GPP TR 28.809, V17.0.0, Mar. 2021, pp. 1-96.

* cited by examiner

TIME-RELATED NETWORK RESOURCE MANAGEMENT

RELATED APPLICATION

This application claims priority to PCT Application No. PCT/EP2021/068501, filed on Jul. 5, 2021, which is incorporated herein by reference in its entirety.

TECHNICAL FIELD

The present disclosure relates to application of a spatial-temporal user distribution for network resource management.

Examples of embodiments relate to apparatuses, methods and computer program products relating to the application of a spatial-temporal user distribution for network resource management.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular 3$^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular 2$^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3$^{rd}$ Generation Partnership Project (3GPP), Telecoms & Internet converged Services & Protocols for Advanced Networks (TISPAN), the International Telecommunication Union (ITU), 3$^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

With respect thereto, 3GPP standards define a concept of Management Data Analytics (MDA) in TR 28.809 and TS 28.104 to monitor, analyze and affect recommendations, perform root cause analysis, or enact policy changes.

A Management Service (MnS) Producer generates data and performance information consumed by MDA (which may be understood to represent a (management application/element/function of a) Service Management Orchestrator (SMO)), which can potentially consume other MDA data (via other MDA Services (MDAS) Producers) and/or 5G core analytics via the Network Data Analytics Function (NWDAF) as illustrated in FIG. 1. MDA observes and performs an analysis that develops an outcome for a MDAS consumer (like e.g. a user, a software, a program, a (management application/element/function of a) SMO) provided through an Application Programming Interface (API), named MDAS, whereby a command can be given for execution and decision.

The present disclose may fit within the MDA framework taking advantage of the existing 5G Performance Measurements TS 28.552 and Key Performance Indicators (KPIs) TS 28.554 related to mobility, user activity, subscriber position, throughput, and session management.

Regarding a user location, the Minimization of Drive Tests (MDT) (TS 37.320) provides a detailed location information (e.g. global navigation satellite system (GNSS) location information) to be included and reported to the management plane via the radio access network if available by a user equipment (UE) when the measurement was taken. If detailed location information is available, the reporting shall include the latitude and longitude. Depending on the availability, parameters like altitude, uncertainty, and confidence may also be included in addition.

3GPP [TS37.320] section 5.1.1.3.3 defines how UEs can report their location information, and other quality indicators (Reference Signal Received Power (RSRP), Reference Signal Received Quality (RSRQ), Received Signal Strength Indicator (RSSI)) at regular time intervals or when needed. Also, real-time text (RTT) can be used in Observed Time Different of Arrival (OTDOA) for triangulation.

Referring now to FIG. 2, FIG. 2 shows the MDT architecture. The OAM management layer can program the 5G Core (5GC) and RAN network for MDT operations. UE MDT data is collected at the Trace Collection Entity (TCE) hosts, i.e., the MDT data repository.

Alternatively, 5G Location Services (LCS) & Location Management Function (LMF) (TS 29.572) defines the functionality to determine the location of a UE. In TS 29.572 Clause 4, the LMF can obtain a location estimate from the UE itself and/or from uplink location measurements from the 5G RAN and AMF as shown in FIG. 3. Additionally, there are 5G methods which are employed to determine the location of a UE, e.g. OTDOA, which is a triangulation method employed since Time Division Multiple Access (TDMA)/Code Division Multiple Access (CDMA) 2G systems.

MDA can assist the operation phase of the Slicing Lifecycle Management (TS 28.530) following the preparation and commission of slices as shown in FIG. 4. This MDA related proposal deals with the operation phase assisting the Supervision, Reporting and Modification of network slices.

However, there is still the problem of managing, like e.g. configuring and/or allocating, network resources to a plurality of UEs at different locations.

REFERENCES

[TS 28.104]: 3GPP TS 28.104—Management and orchestration; Management Data Analytics

[TS 28.530]: 3GPP TS 28.530—Management and orchestration; Concepts, use cases and requirements

[TS 28.552] 3GPP TS 28.552—Management and orchestration; 5G performance measurements

[TS 28.554] 3GPP TS 28.554—Management and orchestration; 5G end to end Key Performance Indicators (KPI)

[TR 28.809] 3GPP TS 28.809—Study on enhancement of management data analytics

[TS 29.572] 3GPP TS 29.572-5G System; Location Management Services; Stage 3

[TS 37.320] 3GPP TS 37.320—Universal Terrestrial Radio Access (UTRA) and Evolved Universal Terrestrial Radio Access (E-UTRA); Radio measurement collection for Minimization of Drive Tests (MDT); Overall description; Stage 2

The following meanings for the abbreviations used in this specification apply:

2G Second Generation
3G Third Generation
3GPP 3$^{rd}$ Generation Partnership Project
3GGP2 3$^{rd}$ Generation Partnership Project 2
4G Fourth Generation
5G Fifth Generation
5GC 5G Core
AI/ML Artificial Intelligence/Machine Learning
AMF Access and Mobility Management Function
AP Access Point
API Application Programming Interface
BS Base Station
CDMA Code Division Multiple Access
CU Centralized Unit
DL Downlink
DSL Digital Subscriber Line
DU Distributed Unit
EDGE Enhanced Data Rates for Global Evolution
EEPROM Electrically Erasable Programmable Read-only Memory
eNB Evolved Node B
ETSI European Telecommunications Standards Institute
gNB Next Generation Node B
GNSS Global Navigation Satellite System
GPRS General Packet Radio System
GSM Global System for Mobile communications
IEEE Institute of Electrical and Electronics Engineers
IETF Internet Engineering Task Force
ISD Information Subscriber Dialing
ISDN Integrated Services Digital Network
ITU International Telecommunication Union
KPI Key Performance Indicator
LCS Location Services
LMF Location Management Function
LTE Long Term Evolution
LTE-A Long Term Evolution-Advanced
MANETs Mobile Ad-Hoc Networks
MDA Management Data Analytics
MDAF Management Data Analytics Function
MDAS Management Data Analytics Service
MDT Minimization of Drive Tests
MnS Management Service
NB Node B
NR New Radio
NSI Network Slice Instance
NSMF Network Slice Management Function
NWDAF Network Data Analytics Function
OTDOA Observed Time Difference of Arrival
PCS Personal Communications Services
PDU Protocol Data Unit
PM Performance Measurements
RACF Resource and Admission Control Functions
RAM Random Access Memory
RAN Radio Access Network
RLF Radio Link Failure
ROM Read Only Memory
RRC Radio Resource Control
RSRP Reference Signal Received Power
RSRQ Reference Signal Received Quality
RSSI Received Signal Strength Indicator
RTT Real-Time Text
SLA Service Level Agreement
SMF Session Management Function
SMO Service Management Orchestrator
S-NSSAI Single Network Slice Selection Assistance Information
STUD Spatial-Temporal User Distribution
TDMA Time Division Multiple Access
TISPAN Telecoms & Internet converged Services & Protocols for Advanced Networks
UE User Equipment
UL Uplink
UMTS Universal Mobile Telecommunications System
UWB Ultra-Wideband
VAP Vectorized acceleration profile
WCDMA Wideband Code Division Multiple Access
WiMAX Worldwide Interoperability for Microwave Access
WLAN Wireless Local Area Network

SUMMARY

Various examples of embodiments of the present disclosure aim at addressing at least part of the above issues and/or problems and drawbacks.

Various aspects of examples of embodiments of the present disclosure are set out in the appended claims.

According to examples of embodiments, there is provided, for example, a method.

In addition, according to examples of embodiments, there is provided, for example, an apparatus.

Furthermore, according to examples of embodiments, there is provided, for example, a computer program product .

Any one of the above mentioned aspects enables a time-related management of network resources, like allocation of network resources and/or a time-related configuration of network slicing to a time-related distribution of a plurality of mobile devices, like mobile terminal endpoint devices or user equipment, thereby allowing to solve at least part of the problems and drawbacks as identified/derivable from above.

Thus, improvement is achieved by apparatuses, methods, and computer program products enabling a time-related allocation of network resources.

BRIEF DESCRIPTION OF THE DRAWINGS

Some embodiments of the present disclosure are described below, by way of example only, with reference to the accompanying drawings, in which.

DESCRIPTION OF EMBODIMENTS

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points (APs), radio base stations (BSs), relay stations, eNBs, gNBs etc., and core network elements or functions, for example control nodes, support nodes, service nodes, gateways, user plane functions, access and mobility functions etc., may be involved, which may belong to one communication network system or different communication network systems.

Figure 1:
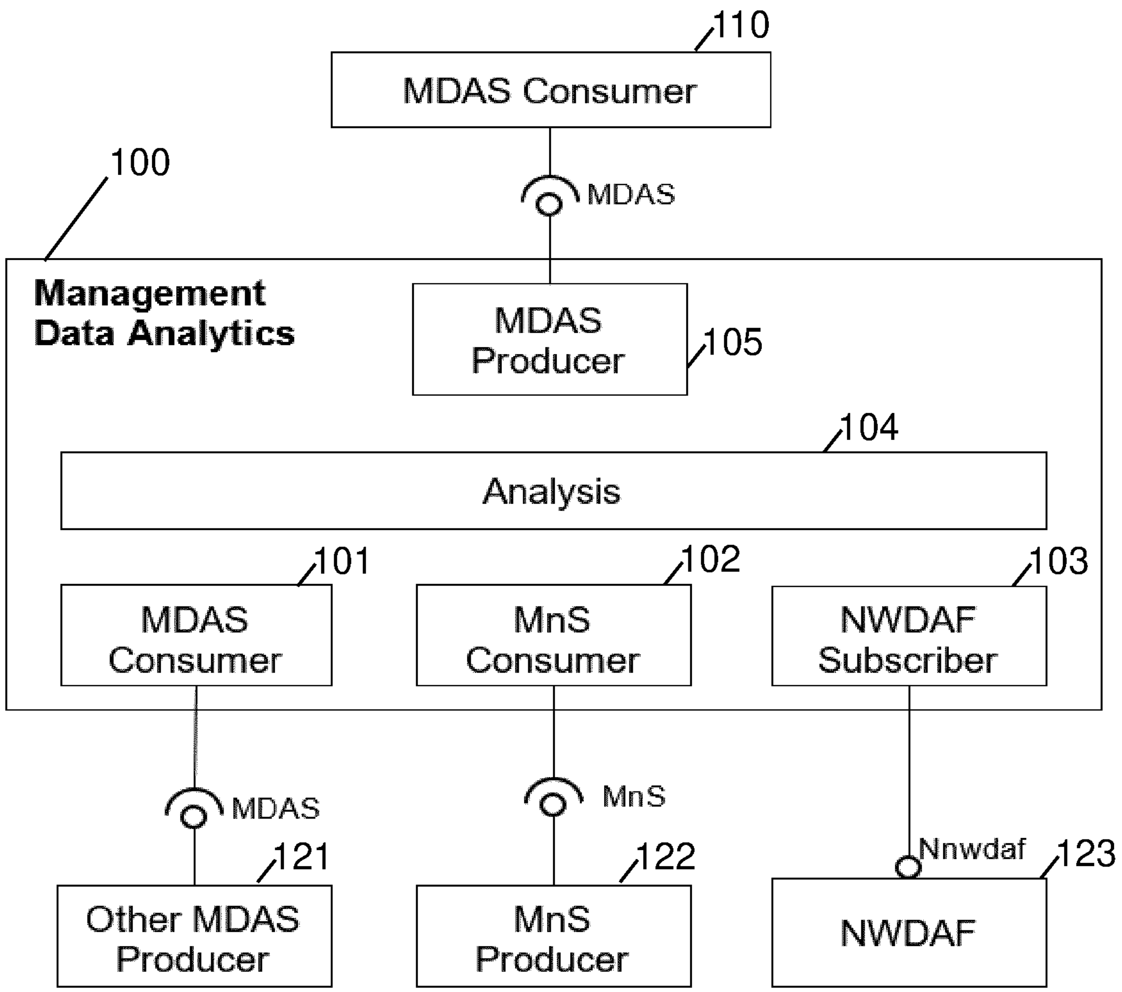
FIG. 1 shows a MDA Architecture, functional overview, and service framework according to various examples of embodiments.
Figure 2:
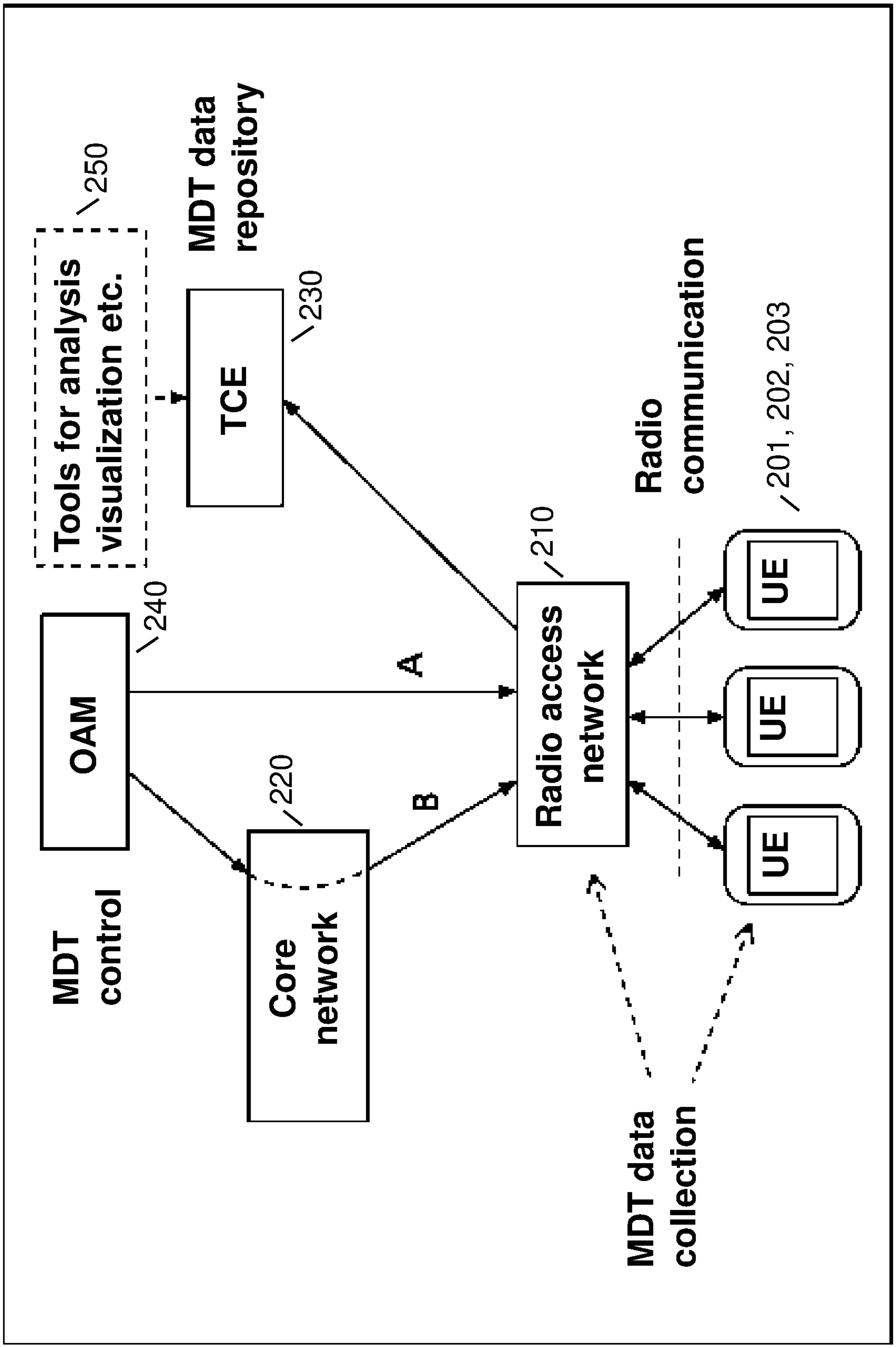
FIG. 2 shows a MDT Architecture according to various examples of embodiments.
Figure 3:
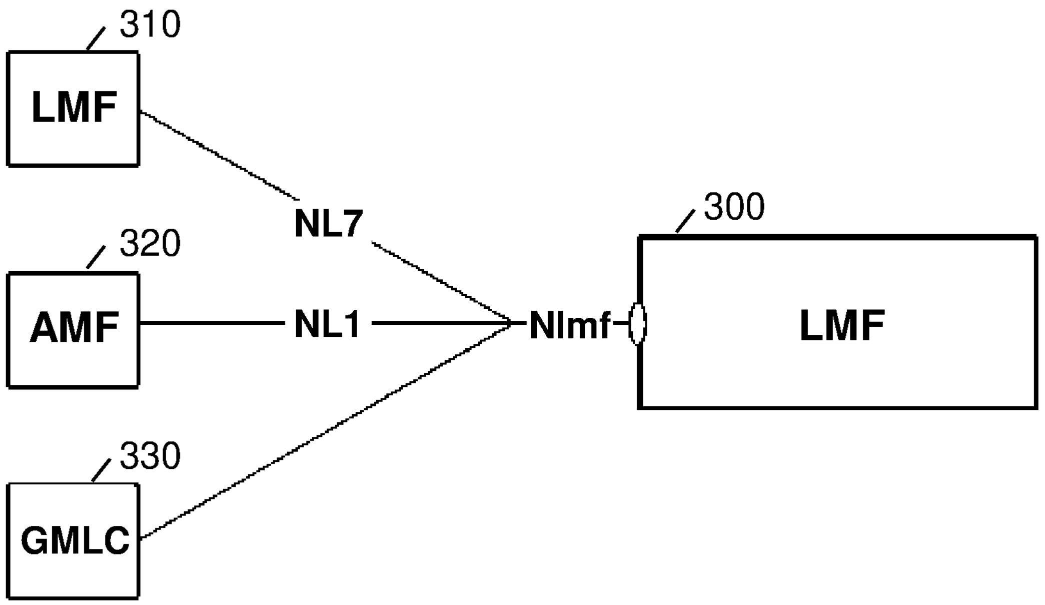
FIG. 3 shows a LMF Architecture according to various examples of embodiments.
Figure 4:
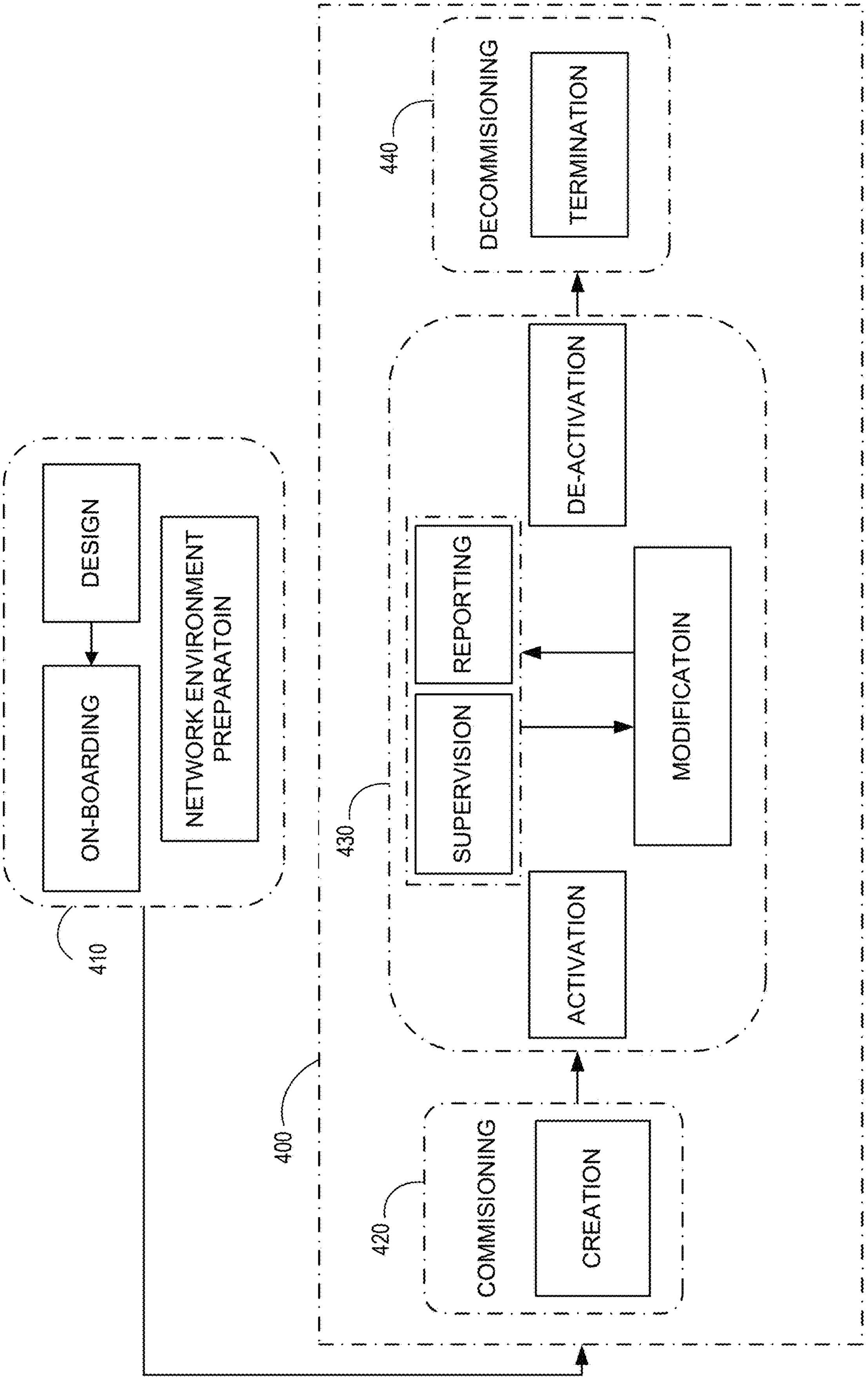
FIG. 4 shows a Life-Cycle Management for network slicing according to various examples of embodiments.

In this context, as already outlined above with reference to FIGS. 1 to 3, there are illustrated different ways for obtaining a UE's position (e.g. geospatial location in e.g. (x, y, z)-coordinates) and with reference to FIG. 4 network slicing information and operations according to various examples of embodiments.

In this regard, in more detail, the present disclosure deals with the problem of user distribution in geographical space and time considering the user activity, and potentially the aggregated throughput, session, and application characteristics. It introduces an aggregated or group view of a three-dimensional user distribution with the target to assist the network resource allocation MnS, unlike current solutions for example mobility analytics that focus on a single user for enhancing or assuring the user experience. In other words, the proposed weighted STUD applies per aggregated group of UEs creating a map of user gravity in a 3D geographical space and time.

Figure 5:
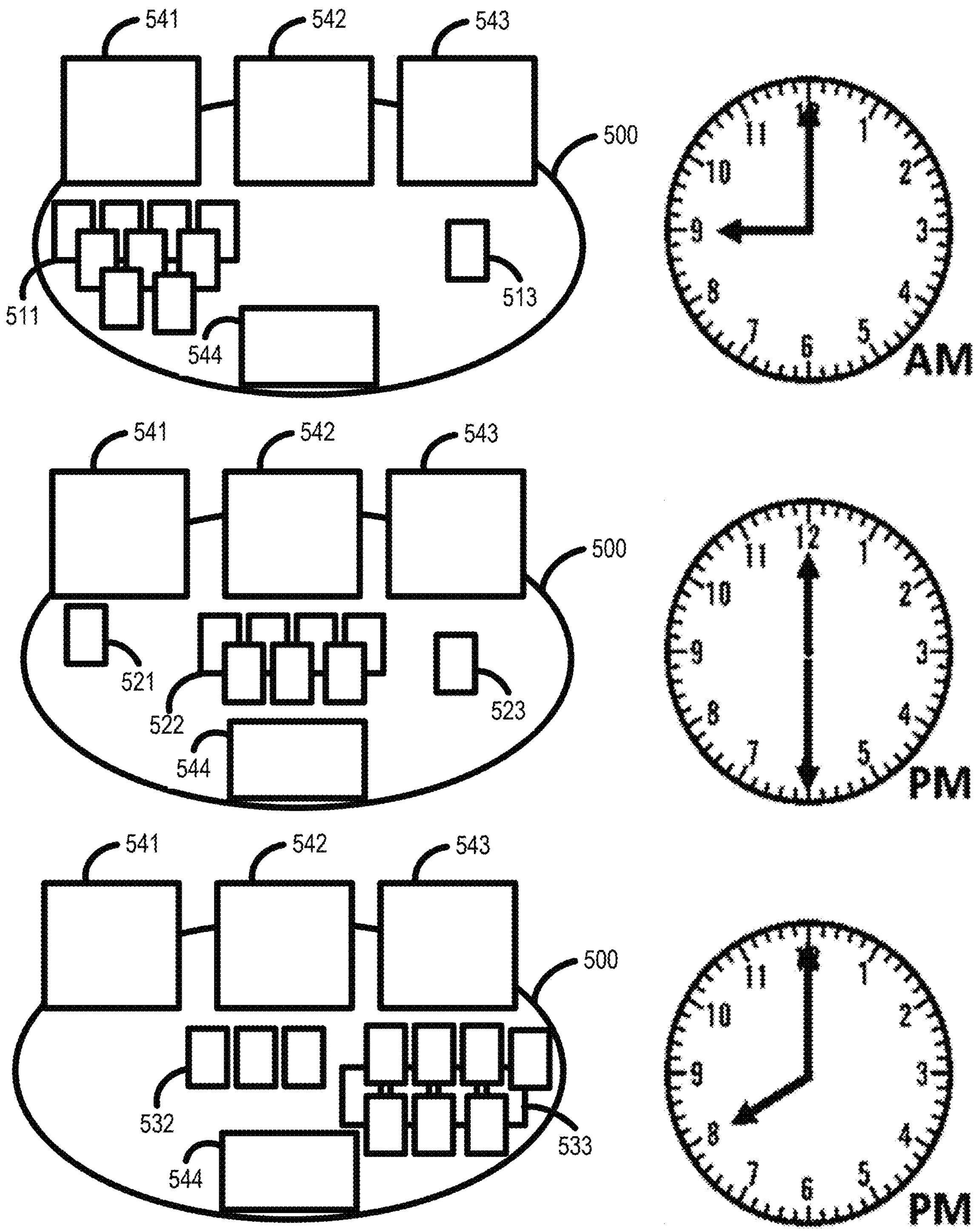
FIG. 5 shows an example of smaller geographical areas within a network slice, which are affected by an aggregated UE distribution, at distinct points in time.

The meta data that needs to accompany the proposed STUD would require enhancements on the respective interfaces either in the (i) tenant interfaces that interacts with the management system and/or (ii) MDA producer and MDA consumer interfaces. The meta data used depends on the usage of the STUD, which may be used to address several problems, which fall into the following three basic categories:

1. Slice request template: Currently, slices are specified and requested using the GSMA NG.116 Template, which defines performance parameters that apply across the entire slice area. Furthermore, it considers a maximum uniform UE distribution based on a fixed upper bound limit. These problems can be addressed by the idea as disclosed in the present specification. Defining parameters which apply to an entire area may prove to be problematic if the area contains smaller geographical coverage points or areas that influence significantly different the user behavior at distinct points in time, as shown in FIG. 5. Further, UEs 511, 513; 521, 522, 523; 532, 533 are not uniformly distributed in an area 500 (served by an access network element, like e.g. an access point 544), they move around during the day 510; 520; 530 (work 541, lunch 542, predetermined event in the evening, like e.g. a concert 543), so there are dynamics that may influence, e.g., the resource management, otherwise the current state of the art is simple but falls short in optimizing performance.
2. Resource optimization: A common 5G challenge is resource management, e.g., to deploy and host network slices, while achieving optimal network and service performance. Slicing optimization is a "big" topic in 5G networks considering how to setup a network to provide optimal functionality, what sorts of slices should be setup and how to best set them up to achieve product differentiation. Service providers compete for how to optimally setup to slices to provide the optimal throughput and UE experience, while conserving the maximum amount of resources.
3. MDA: MDA today does not utilize time series or changing distributions of an aggregate UE location. Analysis is only based on single UEs in cells. MDA are performed without spatial-temporal information. FIG. 5 illustrates this problem showing how network resource allocation may change due to group mobility and variations in UEs distribution (see UEs 511, 513; 521, 522, 523; 532, 533) in geographical slice area (see locations 541, 542, 543) over time (see times 510, 520, 530). As a simple example to outline the illustration shown in FIG. 5 in more detail, there may be assumed to be within a coverage area 500 a factory 541, restaurant district 542 and stadium 543. In the morning 510, the distribution (UEs 511 and 513) skews towards the factory 541, at lunchtime 520, the distribution of UEs 521, 522, 523 shifts towards the restaurant district 542 and in the evening 530, there are a high number of UEs 533 in the stadium location 543. A new type of MDA can be introduced to capture weighted spatial-temporal information for groups of UEs including the required meta data (required types of meta data).

The present disclosure thus provides, according to various examples of embodiments as outlined below in detail, a flexible and/or efficient solution to manage, i.e. allocate time-related network resources and/or time-related network slices to a plurality of UEs based on a time-related spatial distribution of the plurality of UEs.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks like 4G and/or LTE where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network or datacenter networking.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements or functions, like user devices, mobile devices, or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, (core) network elements or network functions ((core) network control elements or network functions, (core) network management elements or network functions), such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a mobile device, a terminal device, control elements or functions, such as access network elements, like a base station (BS), an eNB/gNB, a radio network controller, a core network control element or function, such as a gateway element, or other network elements or functions, as described herein, (core) network management element or function, such as a session management function or a SMO, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to at least some examples of embodiments, the idea underlying the present disclosure is to utilize 5G geolocation methods of the UE, such as MDT or OTDOA, which can be used to pinpoint where mobile devices, like UEs are in a cell and/or geographical area that is served by plurality of different cells. The UE spatial/geospatial location data is gathered over time, which creates a spatial-temporal data series of UE locations. It shall be noted that the spatial-temporal data series may also be statistics or predictions. This data could include drones/planes (i.e. drones/planes may be considered as UEs). This results in a 4-dimensional distribution function and geospatial "UE Gravity Map" which can then be used as input to other MnS including MDA functions to optimize network slices and other use cases.

The present disclosure introduces the notion of weighted STUD in the 3GPP management plane, which can be communicated between an MnS producer and an MnS consumer (which may be an external tenant), e.g. MDAS producer and MDAS consumer. Such STUD shall include meta data, which can assist in using it, e.g., in relation with network slicing and resource allocation. The proposed STUD applies per aggregated group of UEs creating a gravity map ("UE Gravity Map") in geographical space (including the altitude dimension for drones) and time. The perception of weight can represent a UE group aggregated (i) throughput and/or (ii) Quality of Service (QoS) flow or sessions types or (iii) application types, or any combination thereof.

According to various examples of embodiments, in brief, the solution disclosed herein may in general (but not exclusively) follow the steps as outlined below. The solution addresses the problems as outlined above.

Location Information (first step): the Radio Access Network (RAN) sends UE location measurements to a management layer (Service Management Orchestrator, SMO).

Monitoring (second step): the SMO monitors and collects this (sent) data over time.

Analyzing (third step): the analytics layers may build a weighted spatial-temporal distribution function (weighted time series cumulative distribution function) or a prediction of a weighted spatial-temporal distribution function. The distribution function D(x,y,z), or cumulative distribution function (CDF) is the probability that the UE position given in variables X,Y,Z takes on a value less than or equal to a certain position:

$$D(x, y, z) = Pr(X \leq x, Y \leq y, Z \leq z) = \oiiint_{-\infty}^{xyz} P(x)P(y)P(z)dxdydx$$

It may be noted, however, that the use of a cartesian coordinate system is not obligatory, but a different coordinate system, like e.g. a spherical coordinate system, may in general be used as well.

Optimizing (fourth step): the Artificial Intelligence/Machine Learning (AI/ML) analytics can then determine and send optimal slice configurations.

Configuring (fifth step): then, slice configurations is sent (TS 28.541). Thus, UE slice assignments can be adjusted. Further, policies, root causes and analytic options can be provided to MDA consumers based on the distribution function. Also, concepts of Queuing theory are applicable in this context.

According to at least some examples of embodiments, the following points represent analytic requests and analytic reports relevant for the present specification.

The following is with regard to a slice request. Accordingly, the tenant may specify a network slice in a request adopting the expected STUD (that can be pre-calculated) per geographical area that can be represented by at least one distribution function including the following meta data:

time window: identifies for how long the STUD is valid and in case of more than one STUD, the corresponding time schedule.

geographical sub-areas: sub-areas defined as Tracking Areas, Cells, Coordinates, e.g. of a slice, where each STUD (in case of more than a single STUD) should be applied.

context: characterization/classification of each STUD, e.g. according to predetermined even, like rush hour, weekend, concert (see FIG. 5).

confidence degree: indicates the accuracy of the STUD.

Service Level Agreement (SLA): instead of the using the "standard" GSMA NG.116 maximum, a tenant can input a SLA in the form of a distribution where they can specify expectations of (UE) flocking.

The following is with regard to STUD prediction (representing an analytics request according to the present disclosure). Accordingly, an MDA type focusing on the creation of the STUD considering the following MDA request as input is provided herewith:

MDA Name/Id: indicates the MDA name or Id for computing the STUD.

STUD time window: identifies the duration of the STUD or the duration of each STUD if more than a single one is considered.

Model Type: indicates the AI/ML model or logic that should be used to compute the STUD.

Type of STUD: indicates whether the STUD purpose is for prediction or statistics.

STUD weight: indicates the type of the STUD weight, i.e. throughput, Quality of Service (QoS) flow or application type.

Geographical sub-areas: sub-areas defined as Tracking Areas, Cells, Coordinates, e.g. of a slice, where each STUD (in case of more than a single STUD) should be applied.

Target: (determined (according to predetermined criteria) and/or preselected) UE group or all UEs, e.g. in slice, subnet, or any further subdivision.

Reporting method: indicates the reporting mechanism, e.g., to be file-based or streaming.

Time scheduling: schedules/indicates, when a STUD report should be prepared. It applies only for the case of file-base reporting.

UE location: indicates how to acquire a UE location, i.e. (based on using a geolocation determination method/process like) MDT, LCS/LMF or OTDOA.

Filtering: conditions for triggering a report, e.g. if a predetermined load threshold is crossed.

Input granularity: indicates the type of input Performance Measurements (PMs)/KPIs, i.e. non-real-time, near real-time, or real-time.

Uncertainty notification: indicates the willing to receive immediate STUD update once a certain uncertainty level is surpassed. Notion of uncertainty can be measured by introducing a group UE PM as disclosed herewith, which would be a counter that indicates: how many UEs moved towards the same direction, i.e. geo-location or area served by an access point, like e.g.

a cell, or Tracking Area, within a certain time interval, and/or how many new QoS flows are established at a certain geo-location or cell or Tracking Area, within a certain time interval. The time interval can be fixed, i.e., given, or calculated based on the confidence degree, i.e. time interval where a mobility or weight deviation can surpass the expected confidence degree.

The following is with regard to resource optimization (representing an MDA report as disclosed herewith). Accordingly, a STUD aims to achieve resource optimization, e.g. for network slicing by adjusting configuration parameters (for e.g. network resource allocations). This represents an MDA report as disclosed herewith. Such STUD MDA report towards a MDA consumer should include the following attributes and meta data:

- MDA Name/Id: indicates the MDA name or Id for computing STUD.
- STUD time window: identifies the duration of the STUD.
- Validity time: identifies until when the provided STUD is valid.
- Geographical sub-areas: sub-areas defined as Tracking Areas, Cells, Coordinates of a slice where each STUD (in case of more than a single STUD) should be applied.
- Affected objects: Like e.g. (but not exclusively) a Cell, a gNB, a subnet.
- Gravity points: geographical locations, e.g. Tracking Areas, Cells, Coordinates, that attract user movement or locations where many users (e.g. at least a predetermined number of users/UEs) reside.
- STUD mobility data: the mobility distribution of UEs, including a type of the distribution.
- STUD weight data: indicates the type of the STUD weight, i.e. data throughput, QoS flow or application and the corresponding weight distribution.
- Vectorized acceleration profile: indicates how the STUD may change over time.

Confidence degree: indicates the accuracy of the STUD.

Figure 6:
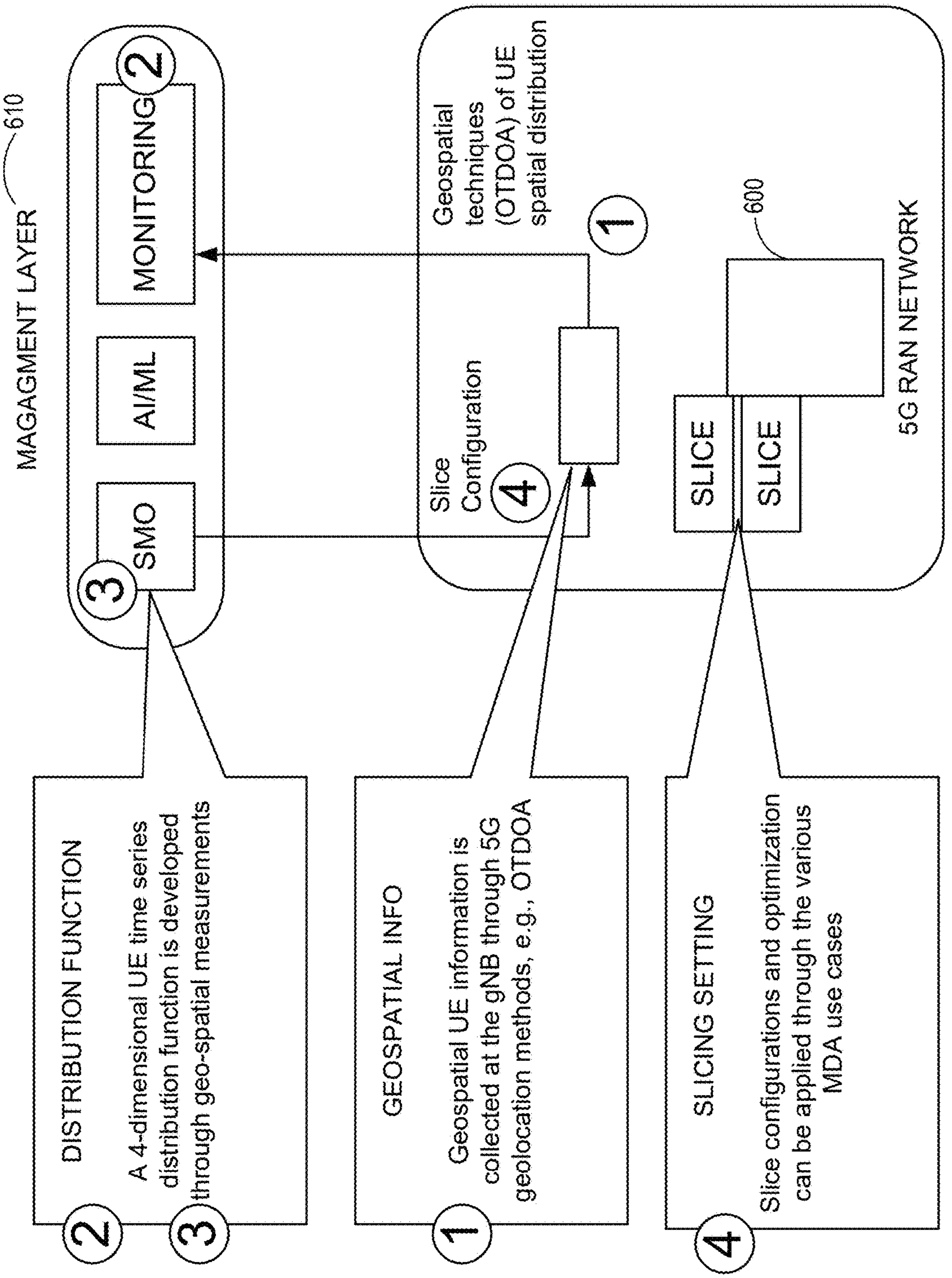
FIG. 6 shows a diagram illustrating a Spatial-Temporal User Distribution (STUD) solution details showing main processing steps according to various examples of embodiments.

Referring now to FIG. 6, there is shown a diagram illustrating STUD solution details showing main processing steps according to various examples of embodiments. Accordingly, a more detailed description of the above-outlined flow of the solution is as follows:

With reference to FIG. 6, indicated number 1, the collection of UE location data: the gNB 600 (RAN in general) collects UE geo-location (positional) information. This can be achieved using MDT and/or LCS/LMF 5G functionality, which reports UE location information. Data is also collected (e.g. by the gNB 600 (the RAN in general)) related to UE data throughput and/or QoS flows as input for a weight distribution.

With reference to FIG. 6, indicated number 2, monitoring of the SMO: the SMO (as an example for a network management element and part of the illustrated Management Layer 610) collects the UE location spatial clustering data over a predetermined time interval, e.g. hours, day, weeks. This helps to build a spatial-temporal data set, which is data that has a time series component.

With reference to FIG. 6, indicated number 3, the distribution function: a 4-dimensional geospatial (3D)-temporal distribution function (time series) is developed through analytics. The MDA system uses the spatial-temporal data to build a distribution function (e.g. time series cumulative distribution function). The UE data throughput, QoS flows and utilization can build a weighted distribution function (e.g. weighted time series cumulative distribution function).

With reference to FIG. 6, indicated number 4, slice settings: generated/determined slice settings can be sent to the gNB 600 in a variety of MDA use cases. This allows the gNB 600 to provide optimal dynamic performance that matches UE geospatial-temporal behavior.

Figure 7:
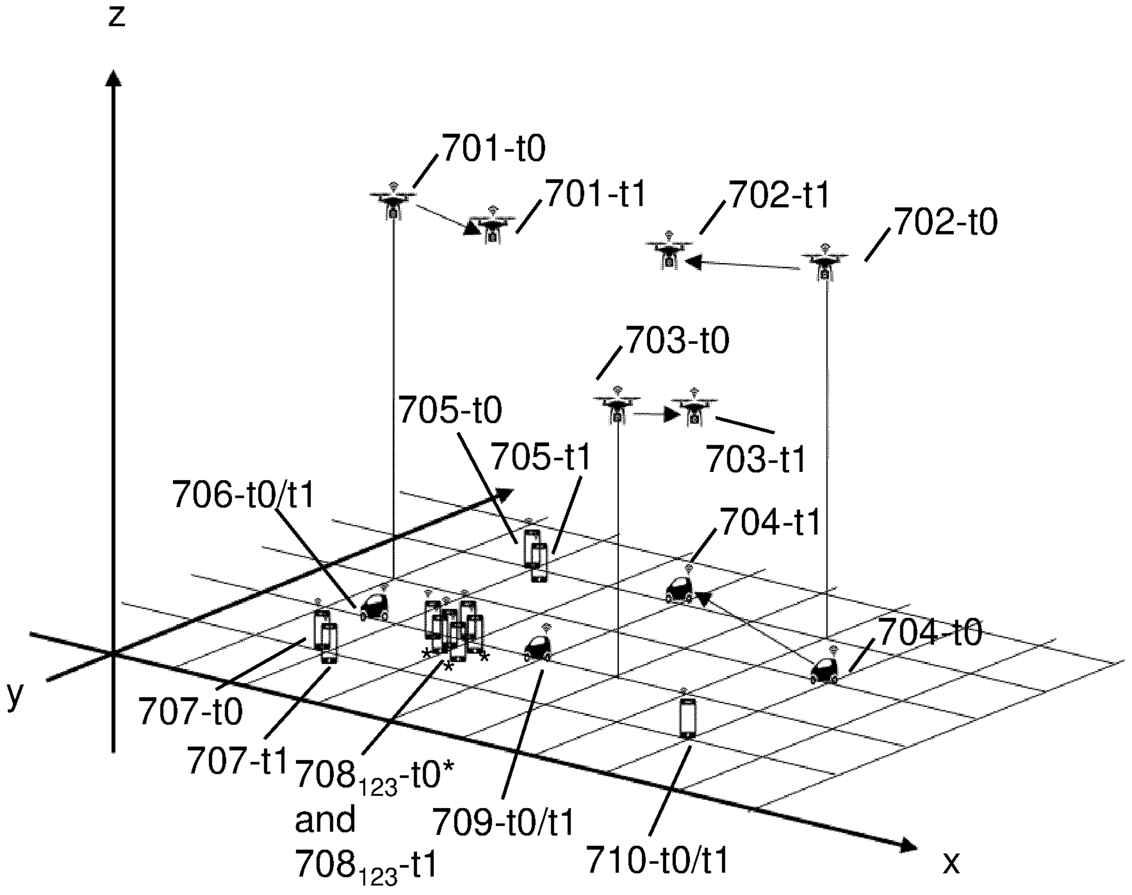
FIG. 7 shows a diagram illustrating an example of UEs and drone's location over time according to various examples of embodiments.

Hence, a spatial-temporal UE distribution is built up through the collection of location and weight data over time. A corresponding simplified example (for reasons of understandability only) is provided in FIG. 7. Referring now to FIG. 7, there is shown a diagram (e.g. location map) illustrating an example of locations of UEs 704 to 710 and drones 701 to 703 over time t0 to t1/at times t0 and t1 (time-related geospatial location information) according to various examples of embodiments (UEs and drones may be understood to represent mobile devices). Accordingly, in the (x, y, z)-coordinate system, all drones 701 to 703 are in motion when comparing the positions (i.e. geospatial locations, wherein it shall be noted that a geospatial location may also be understood to represent a predetermined area/sub-area like e.g. a (part of a) street, a town district, etc.) at certain times t0 and t1 (two times, t0 and t1, selected for reasons of understandability only, whereas a number of considered times/time points may not be limited to two points but may be any number). Similar, movement is observable for UEs 704 (*car*), 705 and 707. UEs 706, 709 (*car*) and 710 are not moving, since the positions are identical for t0 and t1. The three UEs $\mathbf{708}_1$ to $\mathbf{708}_3$ (indicated with reference sign $\mathbf{708}_{123}$) move as a group.

With reference to FIG. 7, the following may be considered.

- Location map: every UE is assigned a location (x,y,z). The UE location from LCS is assigned a spatial positional and stored.
- Time base: each UE is then updated at the next time instance and stored in the analytics layer, i.e. a time index=t+1 (from e.g. t0 to t1 as illustrated in FIG. 7).
- Distribution function: the distribution function D(x,y,z) (time series cumulative distribution function), or cumulative distribution function (CDF) is a probability that the UE location as represented by positional variables X,Y,Z takes on a value less than or equal to a position.

$$D(x, y, z) = Pr(X \leq x, Y \leq y, Z \leq z) = \oiiint_{-\infty}^{xyz} P(x)P(y)P(z)dxdydx$$

- Vectorized acceleration profile (VAP): the VAP for the UE can also be predicted using calculus. This could be achieved based on measurements that focus on e.g. acquiring a UE's time-related accelerations or based on the analytics functions (MDAF).
- Weighted distribution function: the weighted distribution function WD(x,y,z) (weighted time series cumulative distribution function) represents a distribution function with multipliers based on UE activity and application bandwidth or QoS flows (e.g. a UE's network resource requirements). It uses activity multipliers variables ($U_a$,$U_b$,$U_c$) as a function of UE[x]. It uses positional variables X,Y,Z that takes on a value less than or equal to a position.

$$D(x, y, z) = Pr(X \leq x, Y \leq y, Z \leq z) = \oiiint_{-\infty}^{xyz} UaP(x)UbP(y)UcP(z)dxdydx$$

Figure 8:
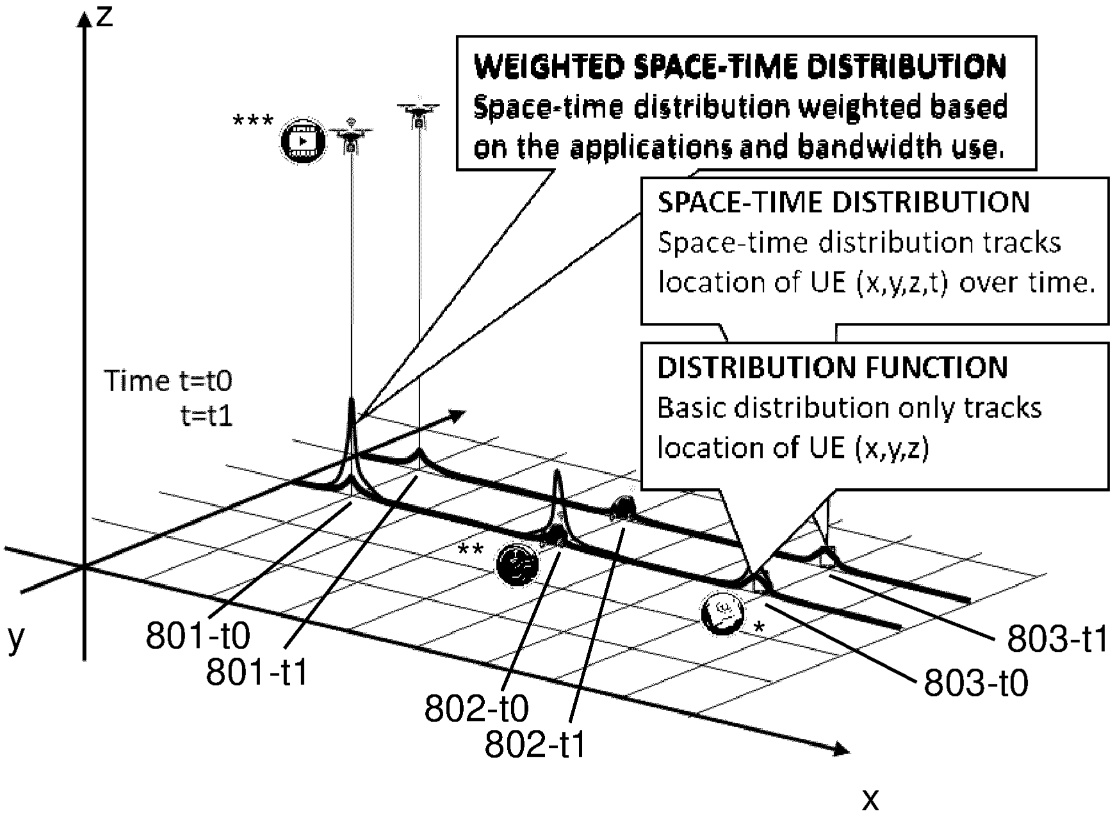
FIG. 8 shows a diagram illustrating an example of a weighted (STUD) of UEs and drones over time according to various examples of embodiments.

In this regard, it is herewith referred to FIG. 8. In FIG. 8, there is shown a diagram illustrating an example of a weighted space-time distribution of UEs and drones over time according to various examples of embodiments. Accordingly, three UEs/mobile devices, a drone 801, a car 802 and a terminal endpoint device 801 are shown, wherein each of these UEs has a specific request for time-related network resources (e.g. data throughput, QoS, application bandwidth). For instance, the drone's 801 request for network resources (time-related network resource requirement information) for e.g. video streaming application (indicated by respective icon *) decreases from t0 to t1 (see movement and corresponding peak position for network resource requirements related to the drone from 801**-*t*0 to 801-*t*1). Similarly, network resources required for the car 802 for e.g. music streaming (indicated by respective icon ) decreases (see movement and corresponding peak position for network resource requirements related to the car from 802**-*t*0 to 802-*t*1). However, it shall be noted that the drone 801 requires more network resources than the car 802 (higher peak, due to video streaming in comparison to music streaming). The terminal endpoint device 801 requires for e.g. email management (indicated by respective icon *) the least network resources (see movement and corresponding peak position for network resource requirements related to the terminal endpoint device from 803-*t*0 to 803-*t*1).

Moreover, according to various examples of embodiments, there are disclosed several MDA Output and Measurements.

Spatial-time user distribution (MDA output): build location-time distribution of UEs and where the UEs would be in a 3-dimensional space (see e.g. FIG. 7).

Weight-based distribution (MDA output): consider UE throughput or QoS flows, which can result in a "weighted" distribution function that reflects the UE usage in combination with their location, e.g. per network resource requirement, like e.g. throughput/bandwidth, per application (see e.g. FIG. 8).

Vectorized acceleration predictions (MDA output): reflects where UEs are expected to be in the next time-tic.

UEloc[1 . . . n] t=t1={x,y,z}=>vector (position, acceleration, velocity)=>UEloc[1 . . . n] t=tn={x,y,z}. Through predictive analytics it may be determined how the distribution will change in the future (a few/predetermined number of time tics from now/a reference point of time) since it is built a function, f(time)=predicted function, pdf(time).

UE grouping (input PM): a counter as disclosed herewith that reflects (i) Movement (of UEs) towards "similar" direction considering speed within a cell; and/or (ii) Handover processes (of UEs) towards an inter/intra-gNB cell (towards an area served by an access network element) with the "similar" direction considering speed/a respective UE's speed; and/or (iii) Instantiation/modification of session/QoS flows in "similar" location.

In this context, it shall be noted that the notion of the expression "similar" as applied directly above can be defined with a degree of similarity, e.g., based on (but not exclusively) at least one of a threshold, a geographical distance, a speed variation, and a deviation value.

According to various examples of embodiments, the below-outlined table summarizes the desired input for allowing MDA to compute the weighted STUD. Accordingly, two herewith disclosed Performance Measurements are new and novel, which are the handover-based UE flocking (handover-based mobile device flocking measurements) and weight-based UE flocking (weighted-based mobile device flocking measurements). The other measurements are used according to at least some examples of embodiments.

| Data category | Required data |
|---|---|
| Service Data | S-NSSAI as defined in clause 5.15.2, TS 23.501. MDAS may derive network topology information |
| Performance Measurements | Average and Distribution of Downlink (DL) UE throughput in gNB as per clause 5.1.1.3.1 and 5.1.1.3.2 of TS 28.552. (Existing Measurements used by STUD) |
| | Average and Distribution of Uplink (UL) UE throughput in gNB as per clause 5.1.1.3.3 and 5.1.1.3.4 of TS 28.552. (Existing Measurements used by STUD) |
| | Inter-gNB handovers, Intra-gNB handovers, Intra/Inter-frequency handover as per clause 5.1.1.6.1, 5.1.1.6.2 and 5.1.1.6.5 of TS 28.552. (Existing Measurements used by STUD) |
| | Handover-based UE Flocking (handover-based mobile device flocking measurements): This measurement indicates the number of handovers towards the same inter/intra-gNB cell within a given time window. |
| | Weight-based UE Flocking (weighted-based mobile device flocking measurements): This measurement indicates the number of Instantiation/modification of session/QoS flows in the same cell within a given time window. |
| | Number of Active and max. number of Active UEs in the DL per cell as per clause 5.1.1.23.1 and 5.1.1.23.2 of TS 28.552. |
| | Number of Active and max. number of Active UEs in the UL per cell as per clause 5.1.1.23.3 and 5.1.1.23.4 of TS 28.552. |
| | Mean and max. number of registered subscribers in AMF as per clause 5.2.1.1 and 5.2.1.2 of TS 28.552. |
| | Mean and max. number of PDU sessions as per clause 5.3.1.1 and 5.3.1.2 of TS 28.552. |
| | Mean and max. number of PDU session modifications, i.e., initiated, requested, successful, carried out in SMF as per clause 5.3.1.6 of TS 28.552. |
| | QoS flow monitoring, i.e., successful, request modify, carried out in SMF as per clause 5.3.2.1 of TS 28.552. |
| Key Performance Indicators | Throughput for slice instance: Upstream/downstream throughput from network and Network Slice Instance (NSI) as per clause 6.3.2 and 6.3.3 of TS 28.554. |
| | Mean number of Protocol Data Unit (PDU) sessions of NSI, PDU session establishment time of NSI as per clause 6.4.1 and 6.4.2 of TS 28.554. |
| | Mean number of successful periodic registration updates of Single NSI as per clause 6.4.4 of TS 28.554. |
| | Maximum number of PDU sessions of NSI as per clause 6.4.5 of TS 28.554. |
| MDT Reports | UE measurements related to RSRPs, RSRQs, RLF, RACF of the cells in slice and UE location information. |
| LCS/LMF | UE location information |
| Network Topology | Topology of the network |

In the following, according to at least some examples of embodiments, there is described a data type report as disclosed herewith that is created in relation to the present disclosure, which that will be contributed to 3GPP TS28.104.

According to various examples of embodiments, the MDAS producer provides the following report with the analytics results to the MnS consumer:

| Information | Description |
|---|---|
| MDA name/ID | Identifier of the STUD service |
| Type of analytics | Statistics or prediction of the provided STUD |
| Duration time | Identifies the time window of the provided STUD |
| Location | Geographical location, i.e., sub-areas defined as |

-continued

| Information | Description |
|---|---|
| | Tracking Areas, Cells, Coordinates, e.g. of a slice, where each STUD (in case of more than a single STUD) should be applied. |
| Affected objects | Objects within the geographical sub-area, e.g., cell(s), gNB(s), subnet(s), and further subdivision |
| Gravity points | Identify geographical locations, e.g. Tracking Areas, Cells, Coordinates, that attract user movement or locations where many users/UEs reside. |
| Vectorized acceleration profile | Indicates how the STUD may change over time (e.g. low, medium, high, based on comparing distribution variation/change values (temporal change and/or spatial change) to predetermined threshold values) |
| Confidence degree | Indicates the accuracy of the STUD |
| Recommendation | Recommendation includes STUD data: STUD mobility distribution of UEs, including type of distribution. STUD weight distribution, i.e. throughput, QoS flow or application and the corresponding weight distribution. |

Figure 9:
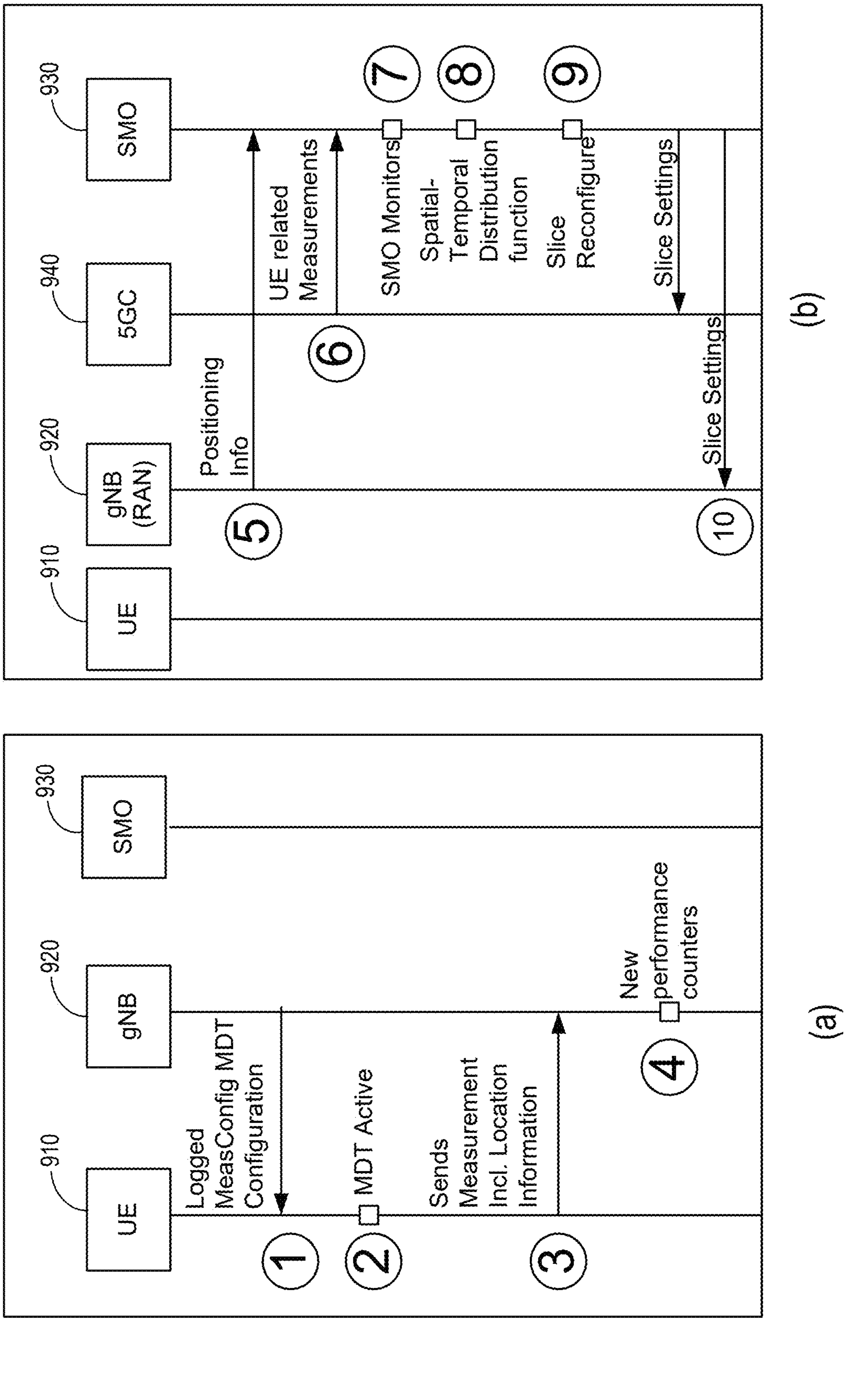
FIG. 9 shows a diagram illustrating a (a) configuration for collecting MDT related data and (b) STUD related data collection, creation of analytics and slice optimization according to various examples of embodiments.

Referring now to FIG. 9, there is shown a diagram illustrating a (a) configuration for collecting MDT related data and (b) STUD related data collection, creation of analytics and slice optimization according to various examples of embodiments. In more detail, steps related to the above-outlined solution include the following (the given numbering is related to the numbering given in FIG. 9):

1) Configuration: the gNB 920 (as an example for an access network element) sends Radio Resource Control (RRC) LoggedMeasurementConfiguration in RRC to UE (as an example for a mobile device) for MDT logging
2) UE setting: the UE 910 activates (its) MDT functionality.
3) UE sending/providing: the UE 910 reports (sends, transmits, provides) measurements including (geospatial) location information to the gNB 920 (RAN). It may be noted that the reported location information is time-stamped/relate to a certain point of time, i.e. indicate (geospatial) location information for a certain time.
4) Performance counters: the Performance counters, the handover-based UE flocking and the weight-based UE flocking (as already outlined above), are reported by the gNB 920.
5) MDT to SMO: the gNB 920 sends MDT data to the SMO Analytics 930 (MDAF), representing an example for a network management element.
6) Core info: the AMF and SMF (5GC) 940 may send mobility and session management information as potential additional data, i.e. the number of active UEs and QoS session establishment/modification info to the SMO Analytics 930. It shall be noted that the core information may be used as supplemented information for reinforcing the information obtained from the gNB (RAN) 920. E.g. for validating a number of active UEs.
7) SMO monitoring: the SMO Analytics 930 monitors location information over a predetermined time interval, e.g. hours, days, weeks.
8) Distribution function: a 4-dimensional spatial (3D)-temporal distribution function (STUD) is developed within MDA (as already outlined above in detail).
9) Slice reconfiguration: slice reconfiguration is calculated using the weighted STUD and provided to the gNB 920. In other words, the STUD/weighted STUD may go into analytics, which allow a MDAS consumer (as e.g. indicated in FIG. 1), like e.g. a service provider to better understand the mobile distributions, e.g. in an area and e.g. within a selected time interval(s). That may be fed into the GSMA NG.116 Slice Parameter settings (NEST) for the network, which may be used to satisfy SLA requirements for the network. These GSMA settings determine e.g. how the slices are deployed in predetermined areas/locations (e.g. tracking areas, regions, etc.). There may be analytics on a daily basis, e.g. how UE(s) behave at certain days, and/or on a long term basis, like e.g. a seasonal basis, for analyzing how UE(s) behave e.g. every Christmas, etc., so a dynamic deploy of network slices (based on the analytics) may be possible and a usage/application of a certain STUD/weighted STUD may be triggered based on e.g. predetermined triggering criteria (certain times/days/events, like e.g. Christmas).
10) Slice setting/management: a configuration of slice resource allocation is performed by the gNB 920 to follow the weighted STUD. It shall be noted that also core network elements (e.g. AMF, LMF, SMF) 940 may be adapted/tuned/configured based on the slice settings provided to the gNB (RAN) 920.

Figure 10:
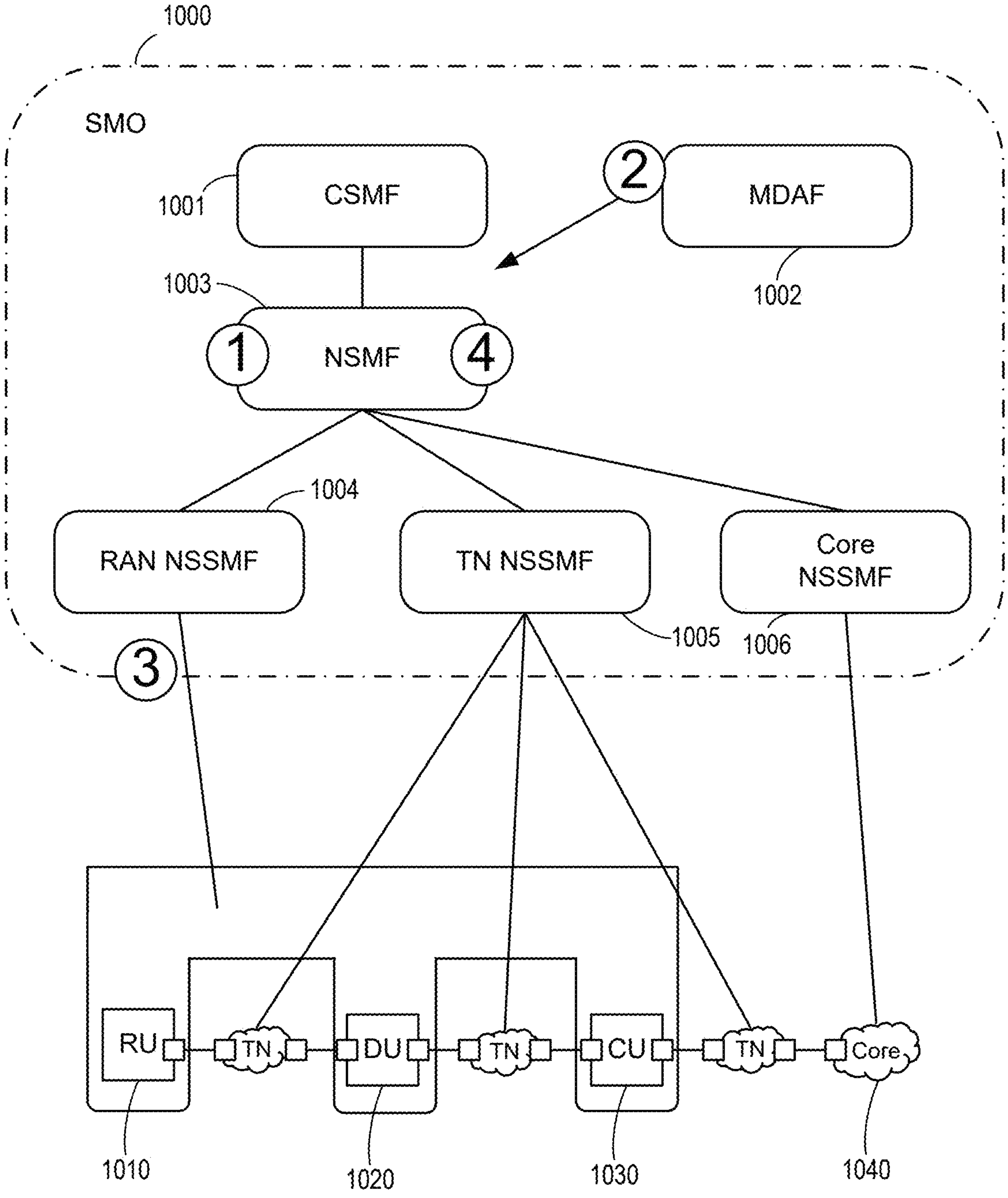
FIG. 10 shows a diagram illustrating network slice optimization using a weighted STUD according to various examples of embodiments.

Referring now to FIG. 10, there is shown a diagram illustrating network slice optimization using the weighted STUD according to various examples of embodiments. In this regard, a key representative use case is the network slice resource optimization and load management. Considering the management architecture as illustrated in FIG. 10, the Network Slice Management Function 1003 (NSMF) that manages the slice resources may consult the corresponding MDAF STUD service to achieve optimization. FIG. 10 shows the main related operations to achieve resource optimization. Accordingly (the given numbering is related to the numbering given in FIG. 10):

1) Setup: Operator prepares and configures network slices
2) Operation: NSMF 1003 (illustrated as part of the SMO 1000) subscribes to STUD analytics service. NSMF 1003 provides filters and triggers based on UE movement and load.
3) Data collection: as gNB is operating NSMF 1003 gets data to feed the analytics service. The RAN collect data (as illustrated through e.g. radio unit RU 1010; distributed unit DU 1020; centralized unit CU 1030 (with transport network TN illustrated therebetween)) and the MDAF 1002 builds a spatial-temporal UE distribution function.
4) Slice optimization: files or stream report data are sent to NSMF 1003. NSMF 1003 optimizes slices based on such data triggering the configuration of resources (e.g. through RAN Network Slice Sub-net Management Function (NSSMF) 1004, TN NSSMF 1005, Core NSSMF 1006).

There are a variety of use cases covered by TS 28.809, that STDU can assist as summarized below.

| Use Case Area | Key Use Cases |
|---|---|
| Coverage Use Cases | Slice Coverage optimization, Paging Optimization |
| Resource Use Cases | RAN UP Congestion, Resource Utilization analytics, Cross-slice resource Optimize, NAS level congestion control optimization |
| SLS Analysis | E2E latency, Network Slice Load, Service Experience, Slice Throughput analysis, UL/DL Throughput/UE in Slice, Jitter, Network Slice Traffic Projection |

-continued

| Use Case Area | Key Use Cases |
|---|---|
| Fault Management | Alarm, Fault prediction, Alarm malfunction analytics |
| Mobility Management | Handover, Beam selection optimization, load balancing optimization, Mobility performance, HO Optimize based on UE trajectory/load |
| Energy Efficiency | MDA Energy Saving |
| Software Management | RAN Node Software upgrade |
| Security | Security Risk Assessment |

The above outlined solution for time-related allocation of network resources to a plurality of time-dependent distributed UEs as an example according to at least some examples of embodiments provides the following advantageous.

Namely, network slicing is touted to be a key technology differentiator for 5G. Allowing for more custom slices that are targeted or more appropriate for where UEs are located and how they behave will provide better service utilizing system resources optimally and help to optimize network resources, utilization and achieve SLA agreements. Resource optimality also helps operators to conserve resources, which can be used to serve more slices enhancing the profitability. Numerous potential use cases apply. The distribution function suggests that slices can be adjusted in a diurnal manner catering to the movement of UEs (that also cover Drones) and regular geospatial-temporal patterns identified. The geospatial aspect can also include aerial position.

Solutions available prior to the solution as disclosed herein would have had to rely on uniform assumptions of UE distribution, allocating the maximum amount of resources. So even the MDA analysis for resource allocation would be flawed. This specification introduces the way to represent shifting UE clustering and so more accurately represents a UE distribution allowing a more accurate way to allocate resources, which serves both resource conservation and service assurance.

In the following, further exemplary embodiments are described in relation to the above described methods and/or apparatuses.

Figure 11:
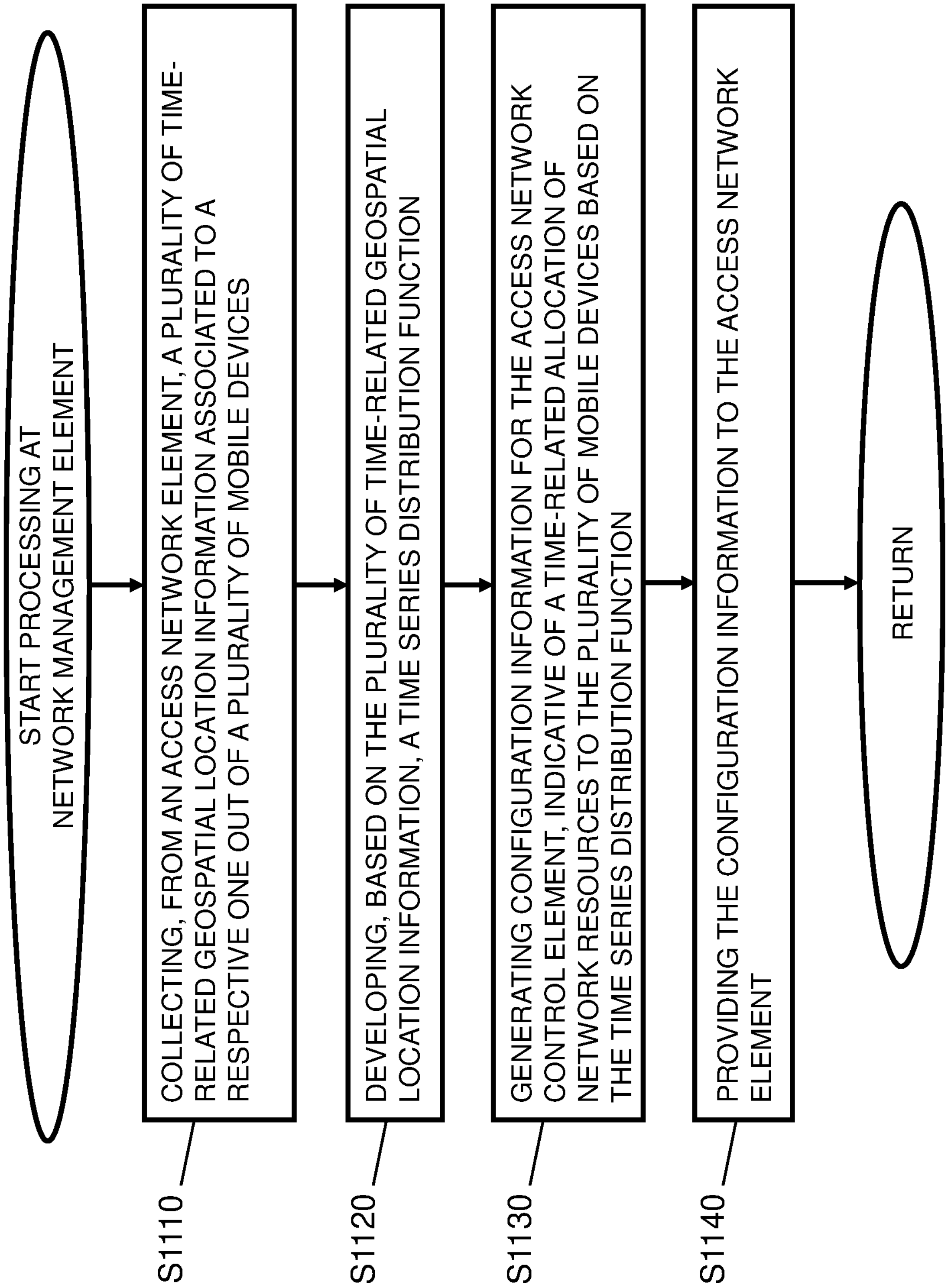
FIG. 11 shows a flowchart illustrating steps corresponding to a method according to various examples of embodiments.

Referring now to FIG. 11, there is shown a flowchart illustrating steps corresponding to a method according to various examples of embodiments.

In particular, according to FIG. 11, in S1110, there is collected, from an access network element, a plurality of time-related geospatial location information associated to a respective one out of a plurality of mobile devices. It shall be noted that the plurality of time-related geospatial location information indicates the respective mobile devices' geospatial locations at certain times.

In S1120, there is developed, based on the plurality of time-related geospatial location information, a time series cumulative distribution function. It shall be noted that the time series cumulative distribution function indicates a probability that a geospatial location defined by its coordinate values of a respective one out of the plurality of mobile devices has coordinate values less than or equal to a selected geospatial location's coordinate values.

In S1130, configuration information for the access network element are generated. The generated configuration information is indicative of a time-related allocation of network resources to the plurality of mobile devices based on the time series cumulative distribution function.

In S1140, the configuration information is provided to the access network element.

Moreover, according to at least some examples of embodiments, the method may further comprise the steps of further collecting, from the access network element and/or a network management element, a plurality of time-related network resource requirement information associated to a respective one out of the plurality of mobile devices. It shall be noted that the plurality of time-related network resource requirement information indicate the respective mobile devices' network resource requirements at certain times. Additionally, the method further comprises developing, from the time series cumulative distribution function, a weighted time series cumulative distribution function, wherein a weighting of the time series cumulative distribution function is based on the plurality of time-related network resource requirement information. Moreover, there is comprised the method step of generating the configuration information to be further indicative of a weighted time-related allocation of network resources to the plurality of mobile devices based on the weighted time series cumulative distribution function.

Furthermore, according to various examples of embodiments, the method may further comprise the steps of predicting geospatial locations for the plurality of mobile devices based on one of predicted locations of a respective one out of the plurality of mobile devices or predicted locations of a respective group of at least some mobile devices out of the plurality of mobile devices, as well as generating the configuration information to be further indicative of the plurality of mobile device's predicted geospatial locations. It shall be noted that the prediction is based on applying predictive analysis on the time series cumulative distribution function or on the weighted time series cumulative distribution function. Alternatively, the prediction is based on developing an associated vectorised acceleration profile indicative of the respective mobile devices' accelerations in a geospatial direction based on applying predictive analysis on the time series cumulative distribution function or on the weighted time series cumulative distribution function.

Additionally, according to various examples of embodiments, the method may further comprise the steps of grouping, by using the time series cumulative distribution function or the weighted time series cumulative distribution function, at least some out of the plurality of mobile devices into groups of mobile devices based on at least one of:

(i) for mobile devices within an area served by the access network element, the mobile devices' movement directions and the mobile devices' movement speeds, (ii) for mobile devices associated to a handover process towards the access network element, the mobile devices' movement directions and the mobile devices' movement speeds, and (iii) for mobile devices associated to a predetermined geospatial location, the mobile devices' time-related network resource requirements or the mobile devices' weighted time-related network resource requirements. Moreover, the method comprises the steps of generating the configuration information to be further indicative of the grouping of the at least some mobile devices.

Optionally, according to at least some examples of embodiments, the method may further comprise the steps of associating the time series cumulative distribution function or the weighted time series cumulative distribution function with at least one of the following types of meta data:

(i) time schedule data for indicating a time-related validity of a respective distribution function,
(ii) geographical application data for indicating an applicability of a respective distribution function at a predetermined geographical location,
(iii) classification data for indicating a classification of a respective distribution function based on a predetermined event related to a predetermined geographical location,
(iv) confidence degree data for indicating an accuracy of a respective distribution function's indicated distribution of the plurality of mobile devices, and
(v) service level agreement data for indicating a predetermined minimum network resource service level to be provided at a preselected geospatial location where at least a predetermined number of mobile devices out of the plurality of mobile devices is expected within a preselected time interval. In addition, the method comprises the steps of generating the configuration information to be further based on the associated types of meta data.

Moreover, according to various examples of embodiments, the method may further comprise the steps of requesting, from a core network management element, input data to be associated with the developed time series cumulative distribution function or the developed weighted time series cumulative distribution function, wherein the input data comprise at least one of information for indicating an identification of a network management element and/or service or process for computing the developed distribution function,
identifying a duration of the developed distribution function,
indicating an artificial intelligence/machine learning model or logic to be used for calculating the developed distribution function,
indicating whether a purpose of the developed distribution function is for prediction or statistics,
indicating the type of developed weighted distribution function's weighting criteria,
indicating geographical sub-areas that represent one of tracking areas, areas served by access network elements and geographical coordinates for application of the developed distribution function,
indicating a group of mobile devices or the plurality of mobile devices as target mobile devices to be targeted by the developed distribution function,
indicating a reporting method for a developed distribution function report, e.g., to be file-based and/or streaming,
indicating a schedule for when a developed distribution function report is to be prepared,
indicating a method for how to acquire the plurality of time-related geospatial location information,
filtering conditions for triggering a distribution function report,
indicating input data for the developed distribution function to be one of non-real-time, near real-time, or real-time input data, and
indicating a request to receive a developed distribution function update once a predetermined uncertainty level is surpassed;

wherein the generated configuration information are further based on the requested input data.

Moreover, according to at least some examples of embodiments, the method may further comprise the steps of providing, to a core network management element and/or a network consumer element, output data to be associated with the developed time series cumulative distribution function or the developed weighted time series cumulative distribution function, wherein the output data comprise at least one of information for indicating an identification of a network management element and/or service or process for computing the developed distribution function,
identifying a duration of the developed distribution function,
identifying until when the develop distribution function is valid,
indicating geographical sub-areas that represent one of tracking areas, areas served by access network elements and geographical coordinates for application of the developed distribution function,
indicating an object affected by the developed distribution function, the object being one of an area served by an access network element, an access network element, and a subnet,
indicating a gravity point that indicates a geographical location that attracts movements of respective mobile devices or a geographical location where at least a predetermined number of respective mobile devices reside,
indicating a mobility distribution of the plurality of mobile devices including a type of the distribution,
indicating the type of weight data of the developed weighted distribution function,
indicating how the developed distribution function may change over time and
indicating an accuracy of the developed distribution function;

wherein the generated configuration information are further based on the provided output data.

Moreover, according to at least some examples of embodiments, the method may further comprise the steps of developing a plurality of different time series cumulative distribution functions and/or a plurality of different weighted time series cumulative distribution functions. The method further comprises generating a plurality of different configuration information based on the plurality of different distribution functions, as well as providing the plurality of different configuration information to the access network element.

Furthermore, according to various examples of embodiments, wherein the configuration information may represent network slicing configuration information for time-related or weighted time-related adjustment of network slice characteristics, operation and behavior.

The above outlined solution for time-related and/or weighted time-related allocation of network resources and or network slices to a plurality of mobile devices based on a time-dependent distribution of the mobile devices as an example according to at least some examples of embodiments provides the following advantages (in addition to the advantages already outlined above).

Namely, an efficient and dynamic allocation of network resources and/or network slices is achieved, which allows to efficiently (resource optimal) achieve, for predetermined geospatial locations, desired service levels and/or desired data throughput. Moreover, most reliable network related communications based on available/allocated network resources (network resource capacities) may be achieved. In brief, the usage of available network resources may be optimized in relation to meeting time-related demands at geospatial locations by reducing/minimizing the risk of provided network resources remaining unused.

Figure 12:
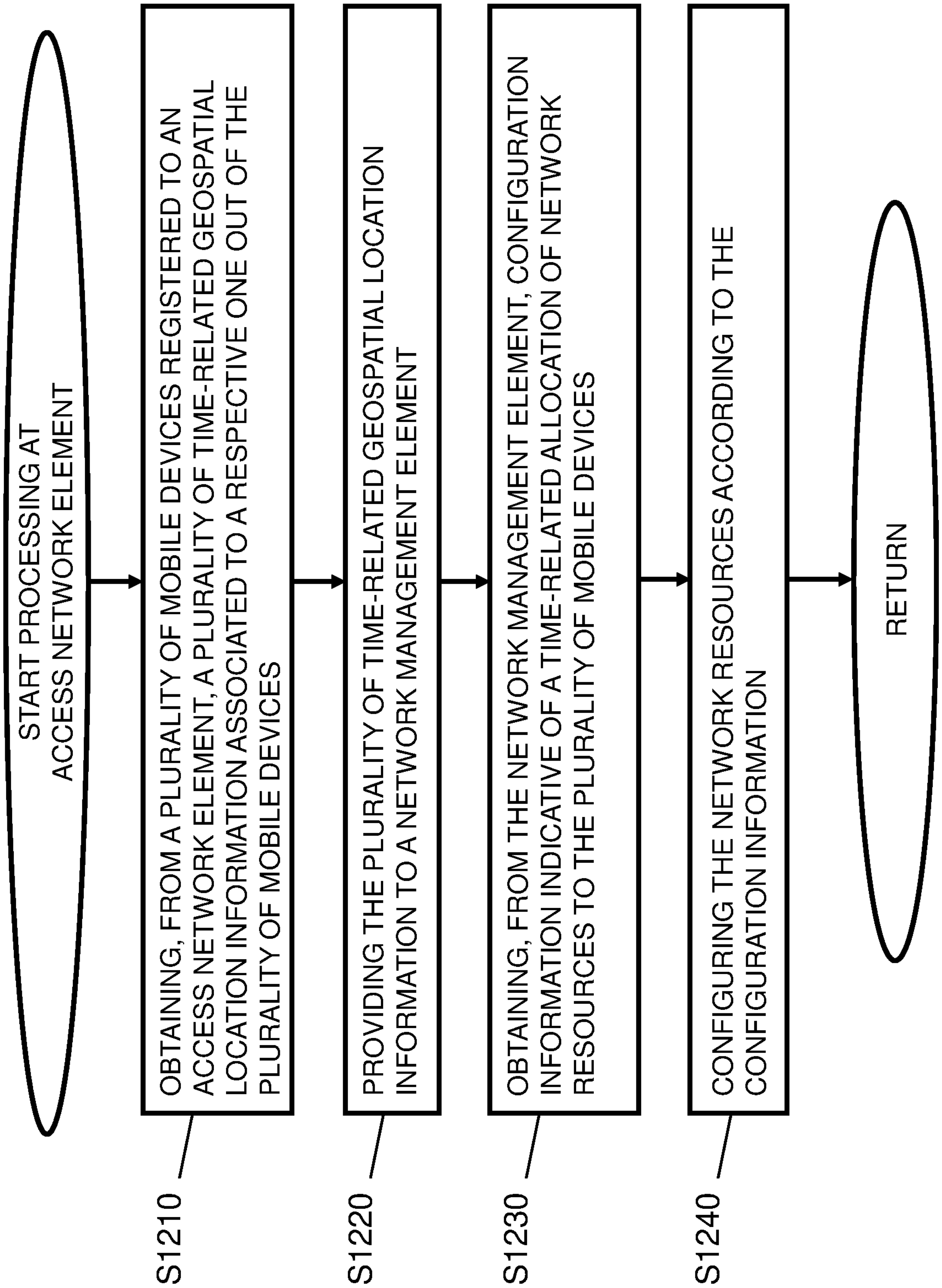
FIG. 12 shows a flowchart illustrating steps corresponding to a method according to various examples of embodiments.

Referring now to FIG. 12, there is shown a flowchart illustrating steps corresponding to a method according to various examples of embodiments.

In particular, according to FIG. 12, in S1210, there is obtained, from a plurality of mobile devices registered to an access network element, a plurality of time-related geospatial location information associated to a respective one out of the plurality of mobile devices. It shall be noted that the plurality of time-related geospatial location information indicate the respective mobile devices' geospatial locations at certain times.

Further, in S1220, the plurality of time-related geospatial location information is provided to a network management element.

Additionally, in S1230, there is obtained, from the network management element, configuration information indicative of a time-related allocation of network resources to the plurality of mobile devices.

Furthermore, in S1240, the network resources are configured according to the configuration information.

Moreover, according to at least some examples of embodiments, the method may further comprise the steps of obtaining the time-related geospatial location information for a respective one out of the plurality of mobile devices based on triggering a geolocation determination process at the respective mobile device and based on associating a timestamp to the geospatial location information obtained through the triggering.

Furthermore, according to various examples of embodiments, the method may further comprise the steps of further obtaining a plurality of time-related network resource requirement information associated to a plurality of mobile devices. It shall be noted that the plurality of time-related network resource requirement information indicate the respective mobile devices' network resource requirements at certain times. In addition, the method comprises further providing the plurality of time-related network resource requirement information to the network management element.

Additionally, according to various examples of embodiments, the method may further comprise the steps of obtaining the time-related network resource requirement information for a respective one out of the plurality of mobile devices based on triggering network resource requirement measurements at the respective mobile device and based on associating a timestamp to the network resource requirement information obtained through the triggering.

Further, according to various examples of embodiments, the method may further comprise the steps of further obtaining confidence degree information based on handover-based mobile device flocking measurements, indicating a number of handover processes related to the plurality of mobile devices within a preselected time interval towards an area served by the access network element with network resources; and/or weighted-based mobile device flocking measurements, indicating a number of modifications of network resource requirements related to the plurality of mobile devices within a preselected time interval in an area served by the access network element with network resources. The method further comprises providing the confidence degree information to the network management element.

Optionally, according to at least some examples of embodiments, the method may further comprise the steps of further configuring the network resources according to the configuration information, wherein the configuration information is further indicative of at least one of the following:

(i) weighting information for weighted time-related allocation of network resources to the plurality of mobile devices, (ii) predicted geolocation information for predicting a respective mobile device's geospatial location, (iii) grouping information for grouping at least some of the mobile devices out of the plurality of mobile device, (iv) categorization information for categorizing time-related network allocations to predetermined application cases, and (v) network slice configuration information for configuring network slices, considering at least one of network slice characteristics, network slicing scalability, network slice performance, network slice functionality and network slice control and management.

Moreover, according to at least some examples of embodiments, the time-related geospatial location information may indicate for a respective one out of the plurality of mobile devices geospatial location for a certain time in (x, y, z)-coordinates; and/or the time-related geospatial location information for a respective one out of the plurality of mobile devices may be obtained based on utilizing, as a geolocation determination method, Minimization of Drive Tests and/or Observed Time Different of Arrival and/or 5G functionality of Location Services and Location Management Function; and/or the time-related network resource requirement information for a respective one out of the plurality of mobile devices may be related to the respective mobile device's data throughput and/or quality of service flows; and/or the configuration of the network resources according to the configuration information may represent a time-related configuration for a dynamic allocation of network resources.

The above outlined solution for time-related allocation of network resources to a time-dependent distribution of mobile devices as an example according to at least some examples of embodiments provides the following advantages (in addition to the advantages already outlined above).

Namely, an efficient and dynamic allocation of network resources and/or network slices is achieved, which allows to efficiently (resource optimal) achieve, for predetermined geospatial locations, desired service levels and/or desired data throughput. Moreover, most reliable network related communications based on available/allocated network resources (network resource capacities) may be achieved. In brief, the usage of available network resources may be optimized in relation to meeting time-related demands at geospatial locations by reducing/minimizing the risk of provided network resources remaining unused.

Figure 13:
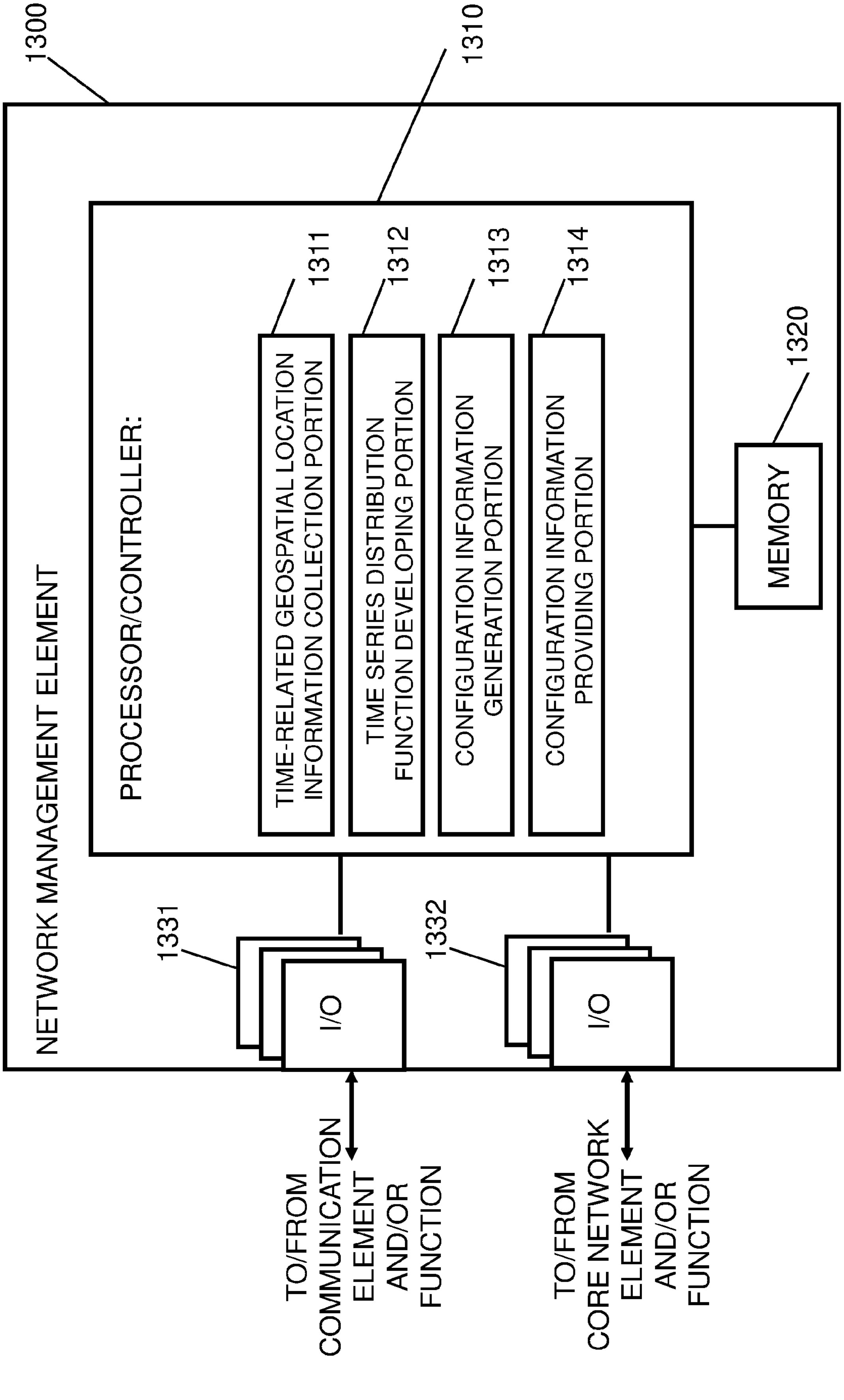
FIG. 13 shows a block diagram illustrating an apparatus according to various examples of embodiments.

FIG. 13 shows a block diagram illustrating an apparatus 1300 according to various examples of embodiments.

Specifically, FIG. 13 shows a block diagram illustrating an apparatus 1300, which may represent a network management element (or function), according to various examples of embodiments, which may participate in a process to enable time-related allocation of network resources to time-dependent distributed mobile devices. Furthermore, even though reference is made to a network management element (or function), the element (or function) may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The above described method, which may be implemented at a network management element like a SMO, thus provides, according to various examples of embodiments, a time-related allocation of network resources to time-dependent distributed mobile devices.

The apparatus 1300 shown in FIG. 13 may include a processing circuitry, a processing function, a control unit or a processor 1310, such as a CPU or the like, which is suitable to enable time-related allocation of network resources to time-dependent distributed mobile devices. The processor 1310 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 1331 and 1332 denote input/output (I/O) units or functions (interfaces) connected to the processor or processing function 1310. The I/O units 1331 and 1332 may be a combined unit including communication equipment towards several entities/elements, or may include a distributed structure with a plurality of different interfaces for different entities/elements. Reference sign 1320 denotes a memory usable, for example, for storing data and programs to be executed by the processor or processing function 1310 and/or as a working storage of the processor or processing function 1310. It is to be noted that the memory 1320 may be implemented by using one or more memory portions of the same or different type of memory, but may also represent an external memory, e.g. an external database provided on a cloud server.

The processor or processing function 1310 is configured to execute processing related to the above described processing. In particular, the processor or processing circuitry or function 1310 includes one or more of the following sub-portions. Sub-portion 1311 is a processing portion which is usable as a portion for collecting time-related geospatial location information. The portion 1311 may be configured to perform processing according to S1110 of FIG. 11. Furthermore, the processor or processing circuitry or function 1310 may include a sub-portion 1312 usable as a portion for developing a time series cumulative distribution function. The portion 1312 may be configured to perform a processing according to S1120 of FIG. 11. Moreover, the processor or processing circuitry or function 1310 may include a sub-portion 1313 usable as a portion for generating configuration information. The portion 1313 may be configured to perform a processing according to S1130 of FIG. 11. Further, the processor or processing circuitry or function 1310 may include a sub-portion 1314 usable as a portion for providing configuration information. The portion 1314 may be configured to perform a processing according to S1140 of FIG. 11.

Figure 14:
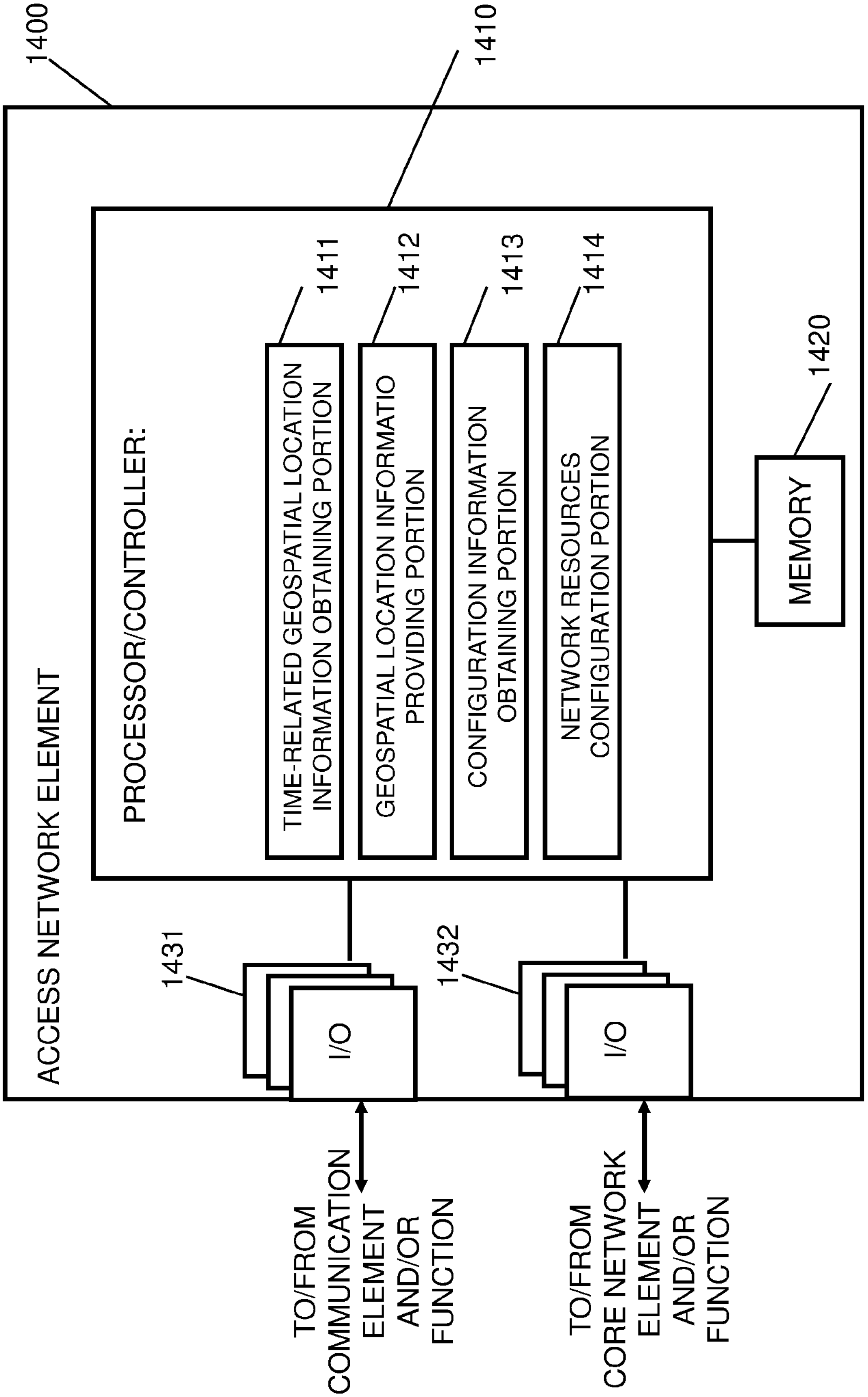
FIG. 14 shows a block diagram illustrating an apparatus according to various examples of embodiments.

Referring now to FIG. 14, there is shown a block diagram illustrating an apparatus according to various examples of embodiments.

Specifically, FIG. 14 shows a block diagram illustrating an apparatus 1400, which may represent an access network element (or function), according to various examples of embodiments, which may participate in a process to enable time-related allocation of network resources to time-dependent distributed mobile devices. Furthermore, even though reference is made to an access network element (or function), the element (or function) may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The above described method, which may be implemented at an access network element like a gNB and/or may be applied to a RAN, thus provides, according to various examples of embodiments, a time-related allocation of network resources to time-dependent distributed mobile devices.

The apparatus 1400 shown in FIG. 14 may include a processing circuitry, a processing function, a control unit or a processor 1410, such as a CPU or the like, which is suitable to enable time-related allocation of network resources to time-dependent distributed mobile devices. The processor 1410 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 1431 and 1432 denote input/output (I/O) units or functions (interfaces) connected to the processor or processing function 1410. The I/O units 1431 and 1432 may be a combined unit including communication equipment towards several entities/elements, or may include a distributed structure with a plurality of different interfaces for different entities/elements. Reference sign 1420 denotes a memory usable, for example, for storing data and programs to be executed by the processor or processing function 1410 and/or as a working storage of the processor or processing function 1410. It is to be noted that the memory 1420 may be implemented by using one or more memory portions of the same or different type of memory, but may also represent an external memory, e.g. an external database provided on a cloud server.

The processor or processing function 1410 is configured to execute processing related to the above described processing. In particular, the processor or processing circuitry or function 1410 includes one or more of the following sub-portions. Sub-portion 1411 is a processing portion which is usable as a portion for obtaining time-related geospatial location information. The portion 1411 may be configured to perform processing according to S1210 of FIG. 12. Furthermore, the processor or processing circuitry or function 1410 may include a sub-portion 1412 usable as a portion for providing geospatial location information. The portion 1412 may be configured to perform a processing according to S1220 of FIG. 12. Moreover, the processor or processing circuitry or function 1410 may include a sub-portion 1413 usable as a portion for obtaining configuration information. The portion 1413 may be configured to perform a processing according to S1230 of FIG. 12. Further, the processor or processing circuitry or function 1410 may include a sub-portion 1414 usable as a portion for configuring network resources. The portion 1414 may be configured to perform a processing according to S1240 of FIG. 12.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

What is claimed is:

1. A method, comprising the steps of:

collecting, by a network management element from an access network element, a plurality of time-stamped geospatial location information associated to a respective one out of a plurality of mobile devices, wherein the plurality of time-stamped geospatial location information indicates the respective mobile devices' geospatial locations at certain times;

developing, by the network management element and for an aggregated group of the plurality of mobile devices, based on the plurality of time-stamped geospatial location information, a spatial-temporal time series cumulative distribution function, wherein the spatial-temporal time series cumulative distribution function indicates a probability that a geospatial location defined by its coordinate values of a respective one out of the plurality of mobile devices has coordinate values less than or equal to a selected geospatial location's coordinate values within a defined time window;

collecting time-stamped network resource requirement information associated with the plurality of mobile devices, wherein the time-stamped network resource requirement information indicates at least one of data throughput, quality-of-service flow characteristics, or application type associated with the mobile devices at corresponding times;

developing, based on the spatial-temporal time series cumulative distribution function and the time-stamped network resource requirement information, a weighted spatial-temporal time series cumulative distribution function, wherein the weighting reflects aggregated network resource requirements across the group of the mobile devices;

predicting spatial-temporal changes in the distribution of the plurality of mobile devices by applying predictive analysis to the weighted spatial-temporal time series cumulative distribution function;

grouping, by using the weighted spatial-temporal time series cumulative distribution function, at least some out of the plurality of mobile devices into groups of mobile devices based on movement directions and movement speeds of the mobile devices associated with handover processes towards the access network element;

generating configuration information at the network management element for the access network element, wherein the configuration information is indicative of a time-dependent and group-based allocation of network resources and network slice characteristics based on the weighted time series cumulative distribution function and the predicted spatial-temporal changes, and wherein the configuration information is further indicative of the grouping of the at least some mobile devices; and providing the configuration information to the access network element to dynamically adjust network resource allocation behavior over time in accordance with the predicted spatial-temporal distribution of the plurality of mobile devices.

2. The method according to claim 1, further comprising the steps of:

associating the weighted spatial-temporal time series cumulative distribution function with confidence degree data for indicating an accuracy of a respective distribution of the plurality of mobile devices; and generating the configuration information to be further based on the confidence degree data.

3. The method according to claim 1, further comprising the steps of:

providing, to a network management element and/or a network consumer element, output data to be associated with the weighted spatial-temporal time series cumulative distribution function, wherein the output data include gravity point information indicating one or more geographical locations that attract movements of the plurality of mobile devices or at which at least a predetermined number of the mobile devices reside; and wherein the generated configuration information is further based on the gravity point information.

* * * * *